(12) United States Patent
Monir Vaghefi

(10) Patent No.: US 11,476,904 B2
(45) Date of Patent: Oct. 18, 2022

(54) CHANNEL SOUNDING IN HYBRID MASSIVE MIMO ARRAYS

(71) Applicant: Blue Danube Systems, Inc., New Providence, NJ (US)

(72) Inventor: Sayed Reza Monir Vaghefi, Campbell, CA (US)

(73) Assignee: Blue Danube Systems, Inc., New Providence, NJ (US)

( * ) Notice: Subject to any disclaimer, the term of this patent is extended or adjusted under 35 U.S.C. 154(b) by 0 days.

(21) Appl. No.: 16/536,122

(22) Filed: Aug. 8, 2019

(65) Prior Publication Data

US 2020/0059276 A1 Feb. 20, 2020

Related U.S. Application Data

(60) Provisional application No. 62/765,092, filed on Aug. 17, 2018.

(51) Int. Cl.
| | |
|---|---|
| *H04W 88/06* | (2009.01) |
| *H04W 36/14* | (2009.01) |
| *H04W 48/18* | (2009.01) |
| *H04W 76/16* | (2018.01) |
| *H04B 7/0456* | (2017.01) |
| *H04L 25/02* | (2006.01) |

(52) U.S. Cl.
CPC ....... *H04B 7/0456* (2013.01); *H04L 25/0226* (2013.01)

(58) Field of Classification Search
USPC ........................................................ 370/267
See application file for complete search history.

(56) References Cited

U.S. PATENT DOCUMENTS

| | | | |
|---|---|---|---|
| 9,362,994 B2* | 6/2016 | Seol | ..................... H04B 7/0456 |
| 2013/0343303 A1 | 12/2013 | Kim et al. | |
| 2014/0050280 A1 | 2/2014 | Stirling-Gallacher et al. | |

(Continued)

OTHER PUBLICATIONS

Intel Corporation, On NR Type II category 2 codebook, Feb. 13-17, 2017 (Year: 2017).*

*Primary Examiner* — Jeffrey M Rutkowski
*Assistant Examiner* — Luna Weissberger
(74) *Attorney, Agent, or Firm* — Occhiuti & Rohlicek LLP

(57) ABSTRACT

A method involving a MIMO communications system including a phased array antenna for establishing communication with a terminal located within a domain, the method including: defining a plurality of sub-domains within the domain; for each sub-domain, defining a corresponding set of analog phase weights to be applied to the phased array antenna for directing beams towards that sub-domain; in succession, selecting each sub-domain among the plurality of sub-domains and for each selected sub-domain: (a) applying the set of analog phase weights for that selected sub-domain to the phased array antenna; (b) performing channel sounding with the terminal while that sub-domain is selected; and (c) receiving feedback from the terminal for that selected sub-domain; and after selecting all sub-domains and from the received feedback, identifying a best sub-domain and identifying a best precoding matrix that in combination with the best sub-domain provides a best communication channel for the terminal.

20 Claims, 20 Drawing Sheets

| # of CSI-RS ports, P | (N₁, N₂) | (O₁, O₂) | Version |
|---|---|---|---|
| 8 | (2,2) | (4,4) | R13 |
|  | (2,2) | (8,8) |  |
| 12 | (2,3) | (8,4), (8,8) |  |
|  | (3,2) | (8,4), (4,4) |  |
| 16 | (2,4) | (8,4), (8,8) |  |
|  | (4,2) | (8,4), (4,4) |  |
|  | (8,1) | (4,-), (8,-) |  |
| 20 | (2,5) | (8,4) | R14 |
|  | (5,2) | (4,4) |  |
|  | (10,1) | (4,-) |  |
| 24 | (2,6) | (8,4) |  |
|  | (3,4) | (8,4) |  |
|  | (4,3) | (4,4) |  |
|  | (6,2) | (4,4) |  |
|  | (12,1) | (4,-) |  |
| 28 | (2,7) | (8,4) |  |
|  | (7,2) | (4,4) |  |
|  | (14,1) | (4,-) |  |
| 32 | (2,8) | (8,4) |  |
|  | (4,4) | (8,4) |  |
|  | (8,2) | (4,4) |  |
|  | (16,1) | (4,-) |  |

(56) References Cited

U.S. PATENT DOCUMENTS

| | | | |
|---|---|---|---|
| 2015/0043439 A1* | 2/2015 | Sajadieh | E04G 23/0218 370/329 |
| 2016/0037560 A1* | 2/2016 | Liu | H04B 7/0695 370/329 |
| 2017/0359791 A1 | 12/2017 | Onggosanusi et al. | |
| 2018/0233820 A1* | 8/2018 | Chen | H01Q 3/24 |
| 2020/0083938 A1* | 3/2020 | Park | H04B 7/0617 |
| 2020/0304190 A1* | 9/2020 | Na | H04B 7/0417 |

\* cited by examiner

| # of CSI-RS ports, P | $(N_1, N_2)$ | $(O_1, O_2)$ | Version |
|---|---|---|---|
| 8 | (2,2) | (4,4) | R13 |
| 12 | (2,2) | (8,8) | R13 |
| 12 | (2,3) | (8,4), (8,8) | R13 |
| 16 | (3,2) | (8,4), (4,4) | R13 |
| 16 | (2,4) | (8,4), (8,8) | R13 |
| 16 | (4,2) | (8,4), (4,4) | R13 |
| 16 | (8,1) | (4,-), (8,-) | R13 |
| 20 | (2,5) | (8,4) | R14 |
| 20 | (5,2) | (4,4) | R14 |
| 20 | (10,1) | (4,-) | R14 |
| 24 | (2,6) | (8,4) | R14 |
| 24 | (3,4) | (8,4) | R14 |
| 24 | (4,3) | (4,4) | R14 |
| 24 | (6,2) | (4,4) | R14 |
| 24 | (12,1) | (4,-) | R14 |
| 28 | (2,7) | (8,4) | R14 |
| 28 | (7,2) | (4,4) | R14 |
| 28 | (14,1) | (4,-) | R14 |
| 32 | (2,8) | (8,4) | R14 |
| 32 | (4,4) | (8,4) | R14 |
| 32 | (8,2) | (4,4) | R14 |
| 32 | (16,1) | (4,-) | R14 |

| Transmission | Channel | 8T8R (2,2,8,8) | 32T32R (4,4,8,4) | Modified 8T8R | Gain vs 32T32R |
|---|---|---|---|---|---|
| SU-MIMO | LOS | 100 | 106 | 110 | 3 |
| | NLOS | 100 | 100 | 103 | 3 |
| MU-MIMO (2 UEs) | LOS | 100 | 128 | 156 | 21 |
| | NLOS | 100 | 142 | 187 | 31 |

- All values in %
- 8T8R (2, 2, 8, 8) serves as reference
- Last column is the gain of the modified 8T8R system compared to conventional 32T32R system

FIG. 19

CHANNEL SOUNDING IN HYBRID MASSIVE MIMO ARRAYS

This application claims the benefit under 35 U.S.C. 119(e) of Provisional Application Ser. No. 62/765,092, filed Aug. 17, 2018, entitled "Channel Sounding in Hybrid Massive MIMO Arrays," the entire contents of which are incorporated herein by reference.

TECHNICAL FIELD

The present invention is directed to methods employed in massive MIMO arrays and, more particularly, to methods using a dynamically configurable, active antenna array system (AAS) to sound channels to acquire channel state information.

BACKGROUND

MIMO is a wireless communication method that increases the capacity and quality of a wireless link by using a plurality of transmit and receive antennas to exploit multipath propagation. MIMO is used in various wireless technology standards. The 3rd Generation Partnership Project (3GPP) is one example of a global effort to determine the policy and strategy of several standards concerning wireless data communication technologies for mobile systems. 3GPP utilizes MIMO technologies in 4G standards such as Long-Term Evolution (LTE), LTE-advanced and 5G standard such as New Radio (NR). A massive MIMO system uses a very large number of transmit antennas (e.g., hundreds or thousands) to simultaneously send and receive multiple data layers to and from multiple receivers. MIMO systems depend on multipath signals to establish high data rate wireless data transmission.

The MIMO system implements a Downlink that conveys signals from transmission points such as a Base Station (BS), referred to as eNodeB in LTE and gNodeB in NR, to User Equipment (UE) terminals and an Uplink that conveys signals from UEs to BSs. The terminals can be cellphones, smartphones, tablets, or any devices with wireless capability communicating with the base station.

The base station, by utilizing the massive MIMO technology, has the capability to form a plurality of radio links with each of a plurality of terminals located in a horizontal and vertical space surrounding this base station. The horizontal space can, for example, be segregated into three 120° segments surrounding the base station with at least one MIMO antenna per segment or domain. The vertical space can be one contiguous segment. Other segregations in the horizontal, as well as vertical, are possible. Various digital signal processing (DSP) techniques are used in conjunction with the antenna arrays of a MIMO system to create a directional signal transmission or reception. The digital signals from the baseband are applied to transmitter/receiver units coupled to one or more antennas in the antenna array. The one or more antennas driven by the ports or transmitters combine the emitted signals from the antenna array such that particular directions of the emitted electromagnetic radiation constructively interfere while other directions destructively interfere thereby forming a directed radiation beam. This directional aspect is referred to as beamforming or spatial filtering.

The overall coverage of the beamforming of an antenna array, also referred to as the maximum scan angle or angular spread, is dependent on the individual antenna domain and the number of antennas driven by a port. If each antenna in the antenna array is driven by a separate port, the beams that are formed have a maximum angular spread or coverage over its domain. Larger antenna arrays are more desirable to increase array gain and multiplexing gain. However, a large antenna array would be costly if a port was used for each antenna. The number of ports implemented in the larger antenna array can be decreased. For example, the array can be partitioned into a plurality of sub-arrays made up of sub-sets of antennas, each driven by a corresponding one of the ports. One benefit of connecting each port to multiple antennas is an improvement in the power efficiency of the antenna array. Another benefit is a reduction in cost, since fewer ports requires fewer hardware components. On the other hand, reducing the number of ports reduces the maximum scan angle of the beams formed by the antenna array over its domain. Another downside of reducing the port count is the generation of sidelobes or spurs formed in the beam generated by the antenna array. Since each port drives multiple antenna elements, those antenna elements are controlled with the same digital weights, thereby reducing the resolution of the antenna array pattern and creating unwanted beam sidelobes. Sidelobes in an antenna array beam pattern in turn reduce the capacity performance of the MIMO system.

The base station strives to boost the capacity experienced by all the UEs in its coverage through various techniques such as spatial multiplexing using multiple antennas and precoding data streams to eliminate inter-stream interference. Precoding is a signal processing operation that is performed on the data streams to reduce interference among transmissions to multiple UEs and maximize the SINR at each of the individual UEs. In order to design the correct precoder for this purpose, a process referred to as channel sounding is used to estimate the channel characteristics of multipath signals. In other words, the BS typically relies on channel state information (CSI) obtained either from feedback given by the UEs based on their own downlink channel estimation performed with the help of downlink pilot signals transmitted from the BS antennas or from uplink pilot signals transmitted by the UEs (under TDD reciprocity assumption). For example, in an FDD (Frequency Division Duplex) system with 'M' antenna elements, the BS would transmit M downlink pilot signals corresponding to the M antennas. The pilot signals are also referred to as CSI reference signals, called channel state information-reference signals (CSI-RS) in Release 10 and beyond 3GPP. The UEs estimate the channel based on these M pilot signals and feed that information back to the BS.

The pilots are specific sequences of signals known to both the base station and the terminal. In the case of FDD, the terminals, after receiving the pilots, use them pilots to determine the characteristics of the channel and feed back that information to the BS. The pilots help to determine the direction, the quality, and the number of independent paths formed in the channel. These are correspondingly represented by, the Precoding Matrix Indicator (PMI), the Channel Quality Indicator (CQI), and the Rank Indicator (RI) and are reported back to the base station from each terminal. The base station uses this information to transmit a more reliable signal and transfer higher data rate to each terminal. More specifically, the BS selects the precoding matrix identified by the returned PMI and applies that precoding matrix to the layers to generate port signals. Alternatively, the BS runs signal processing algorithms, such as zero-forcing, on these estimates to generate the precoding vectors. The data streams that are precoded with these vectors are transmitted to the UEs in such a way that each UE receives its own stream without interference from other streams.

The process of sounding the channel scales linearly with the number M of antennas and if M is large (which is the case with Massive MIMO systems) the control signaling overhead becomes prohibitively large affecting adversely the downlink data rates/throughputs. In addition, for channel sounding with M pilots, traditional antenna array architectures require one RF chain/digital port for every antenna element. This raises the complexity and cost of hardware implementation since each TX/RX digital port involves power hungry components like ADC and DACs.

In view of these drawbacks, the embodiments described herein employ a method that acquires CSI in a system with a fewer number of digital ports by using dynamic subarray mapping thereby reducing both signaling overhead and implementation cost.

SUMMARY

When an active antenna array, or active antenna system (AAS), is used in cellular wireless communications, the AAS can shape or focus radio frequency (RF) energy in the downlink, and receive sensitivity in the uplink, by adjusting the magnitudes and the phase shifts of the transmit and receive signals at its plurality of antenna elements. In cellular systems, downlink (DL) refers to the transmit (TX) operation of the AAS, and uplink (UL) refers to receive (RX) operation.

It would be desirable to maintain the same maximum scan angle or coverage and improve channel sounding accuracy and capacity performance of MIMO systems for a given transmit antenna array when decreasing the number of ports to that antenna array. The present disclosure presents one or more methods of achieving this.

Embodiments of this disclosure include methods and systems to improve channel sounding measurements and capacity of massive MIMO antennas having a reduced port count. Reference signals sent from the MIMO antenna are used to sound the channel. For a MIMO antenna with a sufficient number of ports, the horizontal and vertical angular spreads (HVAS) of the PMIs can cover the desired domain of the base station. However, if the same MIMO antenna has a significantly reduced port count, the PMIs can experience a reduced HVAS, which causes a reduction in the coverage of the desired domain. Examples exist where the HVAS may be reduced by a factor of two or more in either the horizontal and/or the vertical directions causing some of the sub-sectors of the desired domain to receive an attenuated signal or no signal at all. If this occurs, the terminals (user equipment) in these sub-sectors of the desired domain of the base station may not return the accurate channel state information (CSI) feedback information to the base station. Thus, although the reduced port count helps to reduce the cost and complexity of the MIMO system, the reduced port count can directly impact the ability of the CSI-RS to aid in the sounding of the channel.

Some embodiments described herein utilize a digitally controlled analog phase shifter coupled to each antenna of the reduced port MIMO to increase the array's coverage over the desired domain. These phase shifters can be controlled to electrically steer all of the antenna's output beams independently in any direction desired in a matter of milliseconds (ms) or less. The analog phase shifters can also be used to steer all of the antenna's output beams in the same direction. A resource mapping and precoding block generates control signals, in a first time interval, to digitally control the analog phase shifters to steer all the reference CSI-RS beams together to cover a first sub-sector of the desired base station's domain. In a second time interval, all the reference CSI-RS beams together steer to cover a second sub-sector. In each successive time interval, each of the pluralities of sub-sector within the desired base station's domain is covered until the entire desired domain of the base station has been fully covered.

Another embodiment of this disclosure uses the resource mapping and precoding block to combine the PMIs returned from the CSI-RS measurements with the digital control values applied to the analog phase shifters for each of the pluralities of sub-sectors. The combination creates new set of digital control values for the analog phase shifters. These new digital control values are the values necessary to adjust the weights applied by analog phase shifters to steer the beams generated by the sub-arrays in the desired directions, i.e., the direction of the terminal with which the base station will be communicating. The combination of the PMI value with the initial digital value provides a single digital value which is applied to the analog phase shifters to direct the beam in the desired direction, e.g. This step of combining the PMIs with the digital control values that are applied to the analog phase shifters to produce a new set of digital control values for the analog phase shifters (and which eliminates the need for beam steering via the precoding matrices) removes the distortion of the side-lobes that occurs in a reduced port antenna system. Since each port is connected to multiple antennas, the combination of the multiple antennas driven by a single port creates an effective antenna that has spatial characteristics different than the placement of the individual antennas. The PMI value does not compensate for the new spatial characteristics of this effective antenna. However, the new digital value which combines the PMI value with the initial digital control value does compensate for the "effective antenna" effect. The single digital control weight is applied to the analog phase shifters to form "analog" control values. The "analog" control values steer the analog phase shifters for each of the pluralities of sub-sectors allowing the channel to carry data to the terminal within the domain of the base station in a substantially un-distorted (free of unwanted side-lobes) channel.

In general, in one aspect, the invention features a method involving a MIMO communications system including a phased array antenna for establishing communication with a terminal located within a domain covered by the MIMO communications system. The method includes: defining a plurality of sub-domains within the domain; for each sub-domain, defining a corresponding set of analog phase weights to be applied to the phased array antenna for directing beams towards that sub-domain; in succession, selecting each sub-domain among the plurality of sub-domains and for each selected sub-domain: (a) applying the set of analog phase weights for that selected sub-domain to the phased array antenna; (b) performing channel sounding with the terminal while that sub-domain is selected; and (c) receiving feedback from the terminal for that selected sub-domain; and after selecting all sub-domains of the of plurality of sub-domains and from the feedback received from the terminal, identifying among the plurality of sub-domains, a best sub-domain and identifying a best precoding matrix that in combination with the best sub-domain provides a best communication channel for the terminal.

Preferred embodiments include one or more of the following features. The method also includes using the best communication channel to carry out data communication with the terminal. Using the best communication channel to carry out data communication with the terminal involves employing the identified precoding matrix and applying the set of analog phase weights for the identified best sub-domain to the phased array antenna to direct beams towards the identified best sub-domain. Alternatively, using the best communication channel to carry out data communication with the terminal comprises deriving from the identified precoding matrix and the set of analog phase weights for the identified best sub-domain a revised set of analog phase weights and applying the revised set of analog phase weights to the phased array antenna. In that case, using the best communication channel to carry out data communication with the terminal does not involve using the identified (or any) precoding matrix to perform any beam steering. Performing channel sounding with the terminal while a sub-domain is selected involves sending reference signals to the terminal. It might involve non-precoded reference signal transmission (e.g. Class-A transmission) or it might involve precoded reference signal transmission (e.g. Class-B transmission). The feedback from the terminal includes a Precoding Matrix Indicator (PMI) and possibly a Channel Quality Indicator (CQI).

BRIEF DESCRIPTION OF THE DRAWINGS

FIG. 1 illustrates a table of a number of CSI-RS antenna ports determined by a codebook configuration.

FIG. 19 depicts table showing the performance values of one embodiment of the modified 8T8R system in comparison to the conventional 8T8R and conventional 32T32R systems (the conventional 8T8R system serving as reference).

The details of one or more embodiments of the invention are set forth in the accompanying drawings and the description below. Other features, objects, and advantages of the invention will be apparent from the description and drawings, and from the claims.

DETAILED DESCRIPTION

3GPP Fixed Subarray Architecture

FIG. 1 presents a table 1-1 of codebook configurations and port count for an antenna array mapping provided by 3GPP for Release 13 and beyond. This codebook is a formal representation of a plurality of sets of beams the antennas array, assumed coherent, is allowed to generate by the 3GPP standard. The left column of the table in FIG. 1 presents the number of antenna ports P (or CSI-RS ports), ranging over values of {8, 12, 16, 20, 24, 28, and 32}. The next column ($N_1$, $N_2$) shows several possible combinations of a first dimension ($N_1$) and second dimension ($N_2$) per polarization for each port P. The number of CSI-RS ports P is determined by the codebook configuration, where $P=2 \times N_1 \times N_2$. The "2" corresponds to the two polarities of the antenna, each orthogonal to the other (i.e., horizontal and vertical, as one example). The next column ($O_1$, $O_2$) presents the corresponding spatial over-sampling rates ($O_1$, $O_2$) for dimensions ($N_1$, $N_2$) for each port P. The final column indicates the standard 3GPP release number for the different number of ports.

Figure 2:
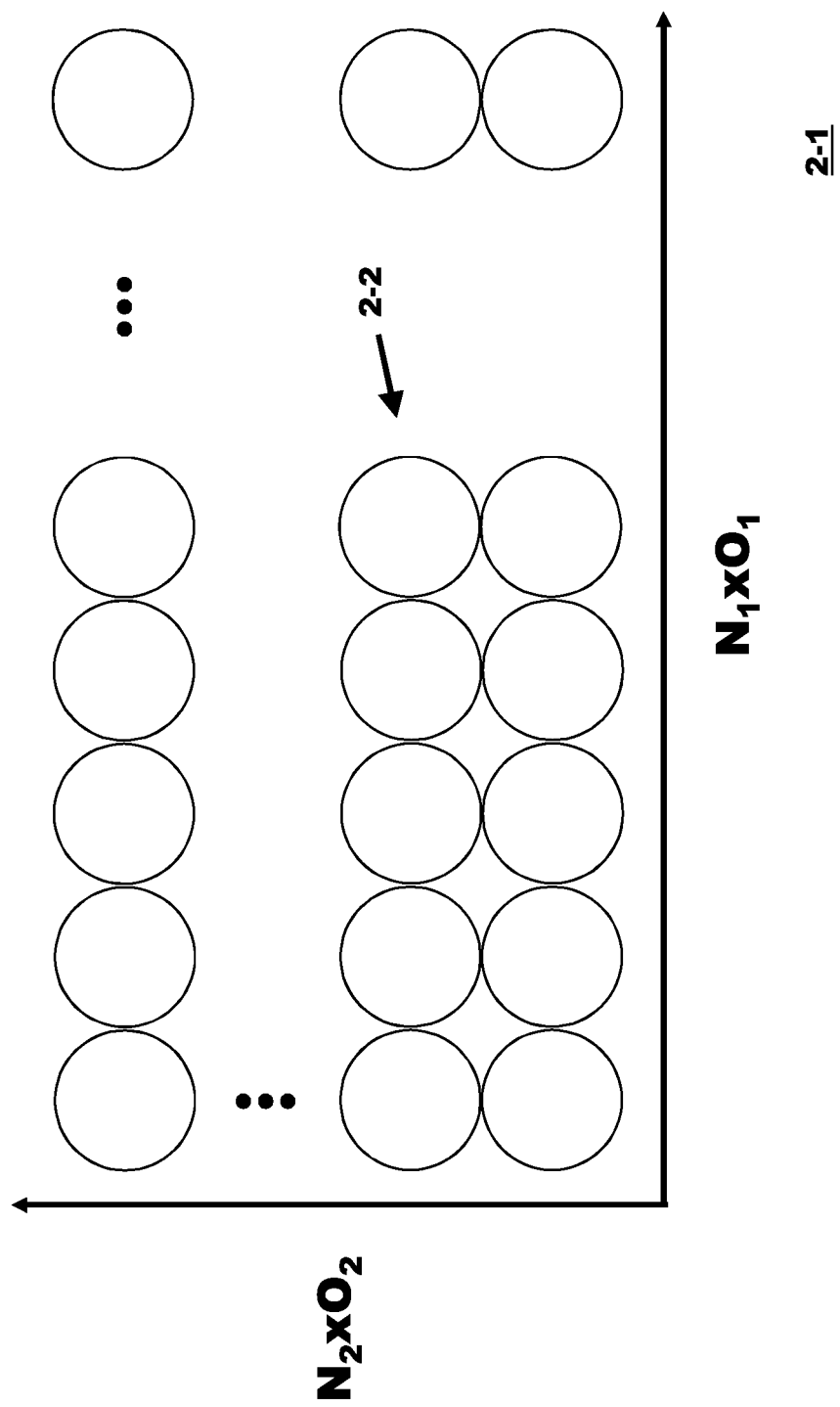
FIG. 2 depicts the product of the ports multiplied by the codebook size per first and second dimension.

FIG. 2 illustrates the total number of beams over the two dimensions 2-1. For example, from FIG. 1, the 32T32R case can be represented by 32 port rows using $N_1=4$, $N_2=4$ and $O_1=8$, $O_2=4$. This provides 32 ($N_1 \times O_1$) beams in the vertical direction and 16 beams ($N_2 \times O_2$) in the horizontal direction for a total of 512 beams covering two dimensions. Four co-phasing parameters of the polarization 0°, 90°, 180°, and 270° rotations (not illustrated) are assigned to each beam 2-2 providing a total of 2048 PMI's for the 32T32R case, assuming one data layer is being transmitted. The co-phasing parameters are used to change the phase rotation between two polarizations.

From FIG. 1, the 8T8R case with 8 ports using $N_1=2$, $N_2=2$ and $O_1=8$, $O_2=8$ can provide 16 beams in the vertical direction and 16 beams in the horizontal direction for a total of 256 beams. As before the four polarization 0°, 90°, 180°, and 270° rotations are assigned to each beam providing a total of 1024 PMI's for the 8T8R case. This technique can be extended to two or more data layers where a data layer is an independent data stream.

Figure 3:
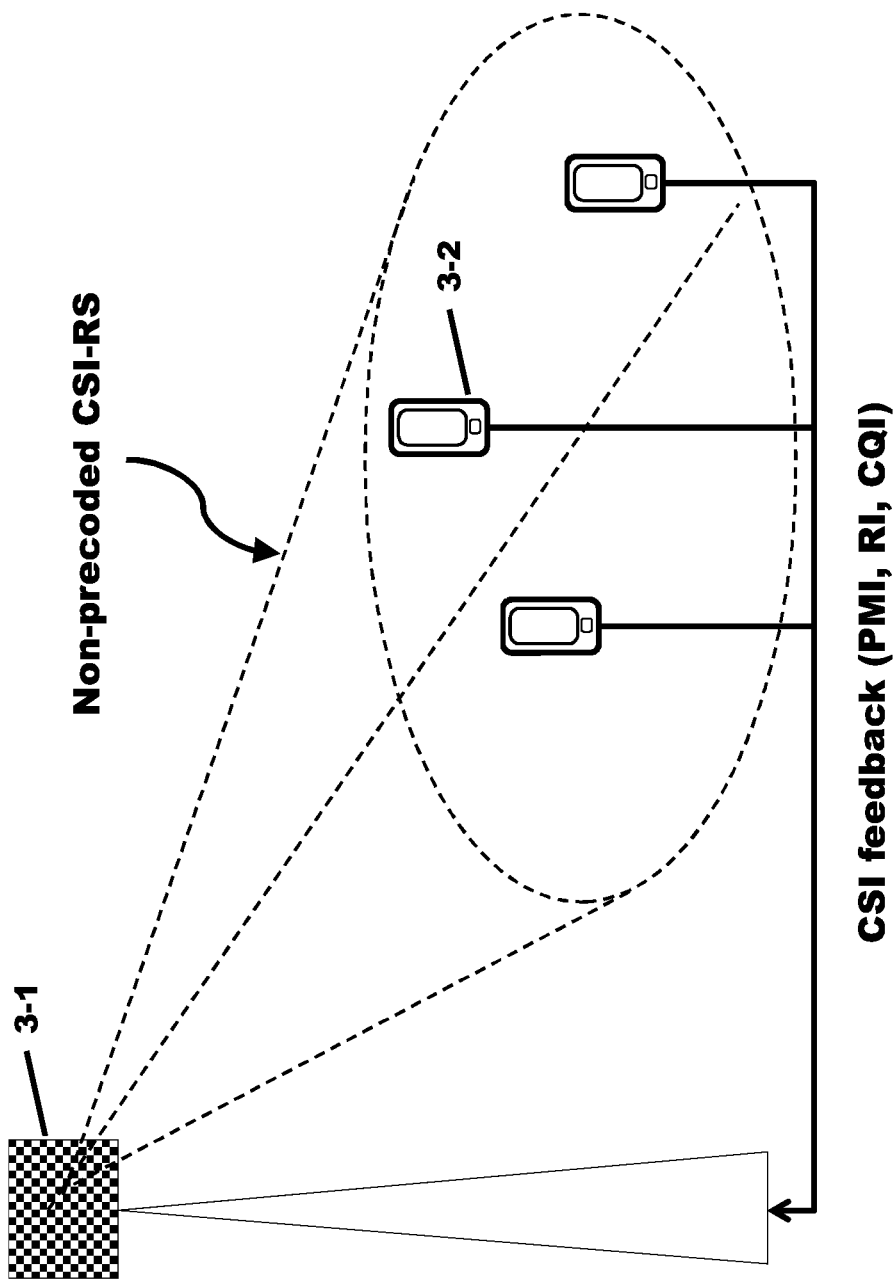
FIG. 3 shows the Class-A non-precoded CSI-RS transmission system with the base station and several terminal devices.

FIG. 3 illustrates the non-precoded (non-beamformed) CSI-RS transmission known as Class-A. The base station is not initially aware of the channel condition or the location of the one or more terminals 3-2 in its domain. The base station through antenna 3-1 sends a CSI-RS from each antenna port to all of the terminals in its domain. Based on the received CSI-RS, each terminal then estimates the channel state information and selects a suitable precoding weight from a predetermined set of candidates (Codebook). The terminal sends back the selected index as a PMI (Precoding Matrix Indicator). In addition to PMI, CSI feedback information also includes the RI (Rank Indicator), which indicates the number of transmission streams, and a CQI (Channel Quality Indicator) that determines the required modulation and coding scheme. This feedback information from the terminal to the base station is sent wirelessly and closes the loop of the base station sending user data to the terminals.

Figure 4:
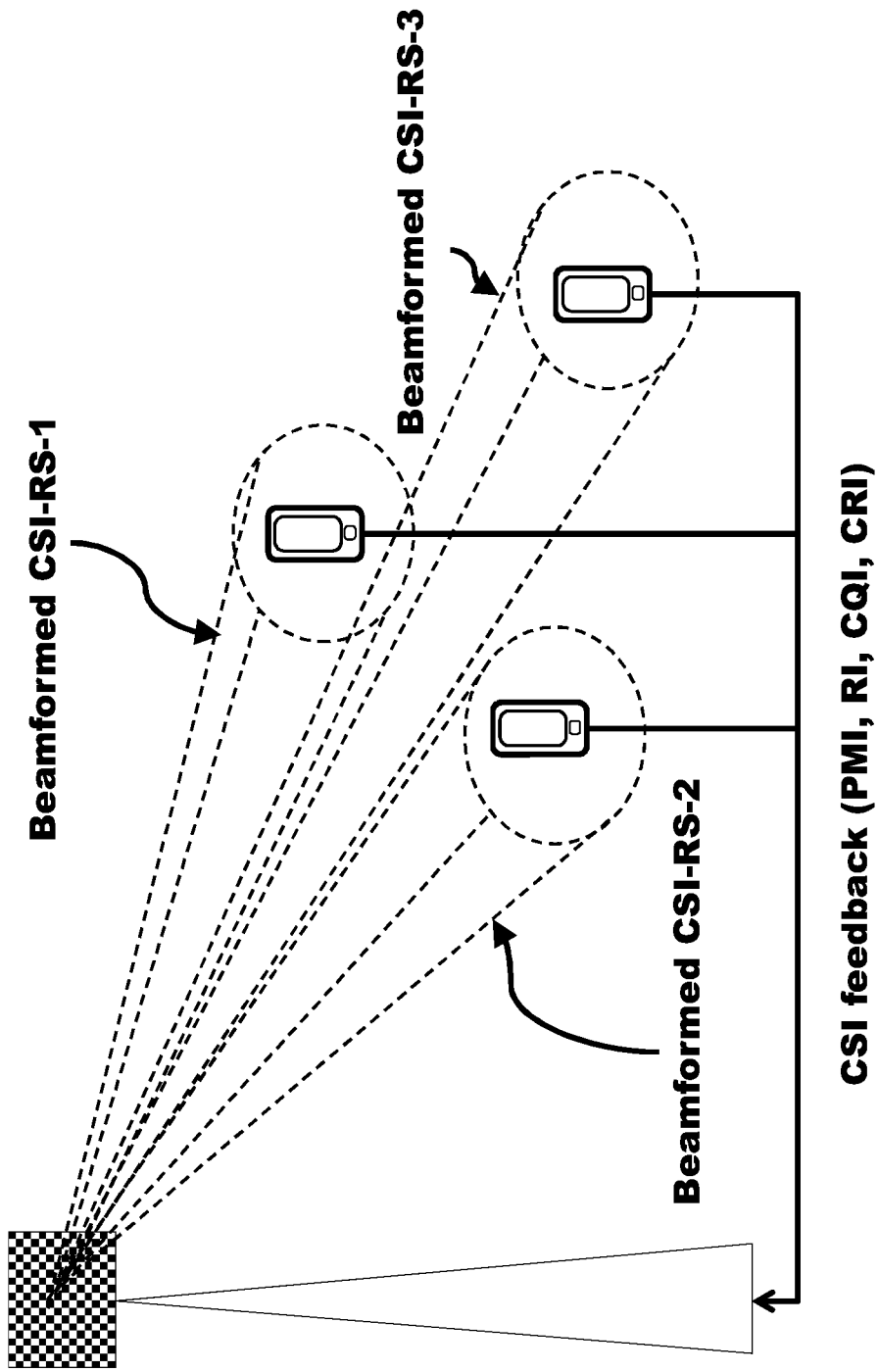
FIG. 4 depicts the Class-B beamformed CSI-RS transmission system with the base station and several terminal devices.

FIG. 4 illustrates the precoded (beamformed) CSI-RS transmission known as Class-B. The base station sends multiple beamformed CSI-RSs to its domain. The terminal selects one of the beamformed CSI-RSs and returns its CSI-RS Resource Index (CRI) along with the CQI to the base station. If the terminal is scheduled with more than one layer of data, the terminal also reports the PMI and M. As before, this feedback information from the terminal to the base station completes the loop of the base station sending data to the terminal.

Figure 5:
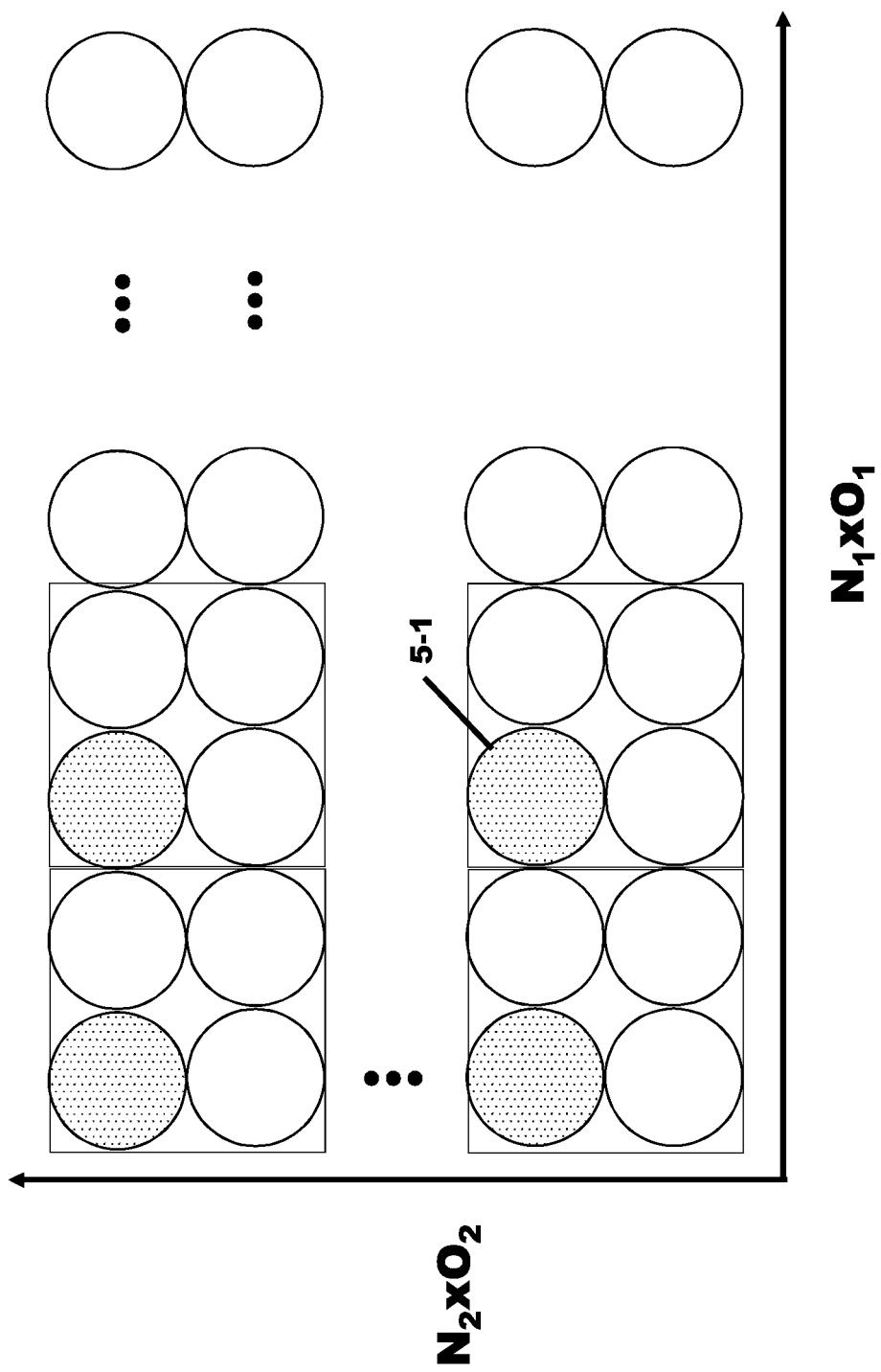
FIG. 5 illustrates the Hybrid CSI method using utilizing both the combination of coarse Class-A and the beamformed Class-B.

3GPP also supports hybrid CSI process technique where a combination of Class-A and Class-B processes is used. One example of a hybrid process is illustrated in FIG. 5. In this case, CSI acquisition is performed in two stages. In the first stage, the terminal uses a Class-A technique to report a coarse direction, where only one beam (5-1) within a group of four beams is reported. In the second stage, the base station generates 4 beamformed CSI-RSs around the reported direction in the first stage and then the terminal reports the best beam out of the 4 beamformed CSIs. The main idea of a hybrid technique is to reduce the complexity of terminal CSI reporting.

Figure 6:
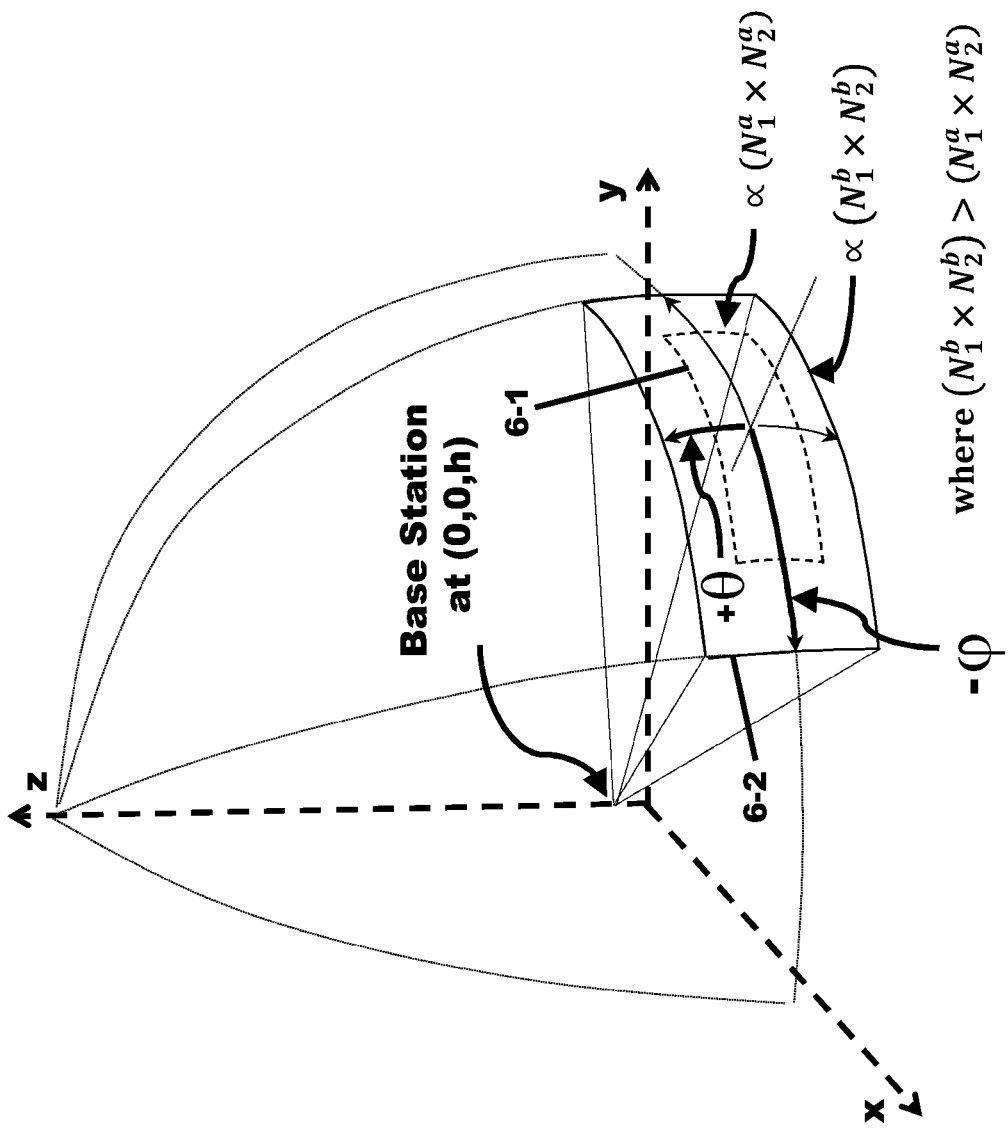
FIG. 6 illustrates the angular spread of electromagnetic radiation in delta ($\theta$) and phi ($\varphi$) for two different $N_1$ and $N_2$ product values.

FIG. 6 shows a graphical representation of a base station located at a given height (h) in the z-direction with its electromagnetic radiation covering a region of a spherical surface surrounding the base station. The first rectangular region 6-1 specified by the dotted rectangle is proportional to the (first dimension times the second dimension) product of $N_1^a \times N_2^a$ while the larger solid lined rectangle 6-2 is proportional to the product of $N_1^b \times N_2^b$, where the second product is greater than the first product. Given the same MIMO antenna array, as the number of ports increases, the product of the two dimensions of the port values also increases, and correspondingly the covered area increases as well. The rectangular areas are an approximation to the actual outlined shaped areas of the plurality of beams. Conventionally, the vertical angular changes are specified by the symbol θ while the horizontal angular changes are specified by the symbol cp.

Figures 7A, 7B:
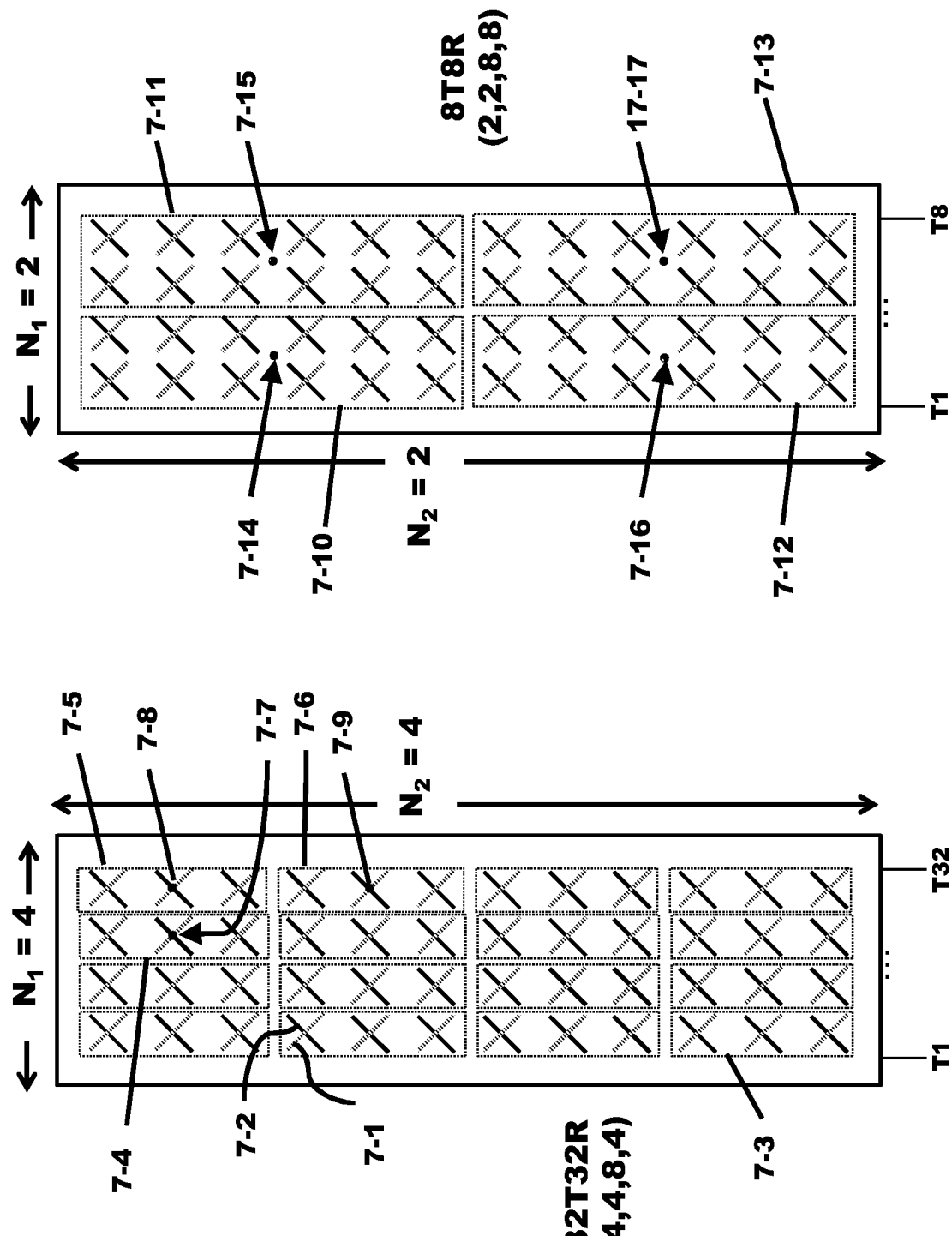
FIG. 7A-B shows two different partitions (32T32R and 8T8R) of horizontal and vertical port values for the same antenna array.

Two physically identical MIMO antenna arrays (number of antennas and placement of antenna elements) but partitioned into groups differently are depicted in FIG. 7A and FIG. 7B. Two different group partitions are selected from a plurality of possible group partitions. Both antenna arrays have a first set of 48 antennas 7-1 oriented normally (first polarized) and a second set of 48 antennas 7-2 oriented orthogonal (second polarized) to the first set. The array of FIG. 7a is a 32T32R (4, 4, 8, 4) system that is formed by grouping sets of three antennas within the dotted rectangles, for example, 7-3, 7-4, 7-5 and 7-6. This grouping causes the 32T32R system to have a first dimension ($N_1$) of 4 and a second dimension ($N_2$) of 4 for a total of 16 ports per polarization. A first radio frequency (RF) chain (or port) couples to three of the normal antennas, oriented in a first direction, and a second RF chain (or port) couples to the corresponding three orthogonal antennas, oriented in an orthogonal direction to the first direction, within each dotted rectangle. Thus, in total, the 32T32R as depicted in FIG. 7A has 32 ports (T1-T32): 16 ports for the first polarized antennas and 16 ports for the second polarized antennas.

Similarly, the 8T8R system depicted in FIG. 7B has the antennas in the array partitioned into sets of twelve antenna elements 7-10, 7-11, 7-12 and 7-13 (also referred to as sub-arrays). This grouping causes the 8T8R system to have a first dimension ($N_1$) of 2 and a second dimension ($N_2$) of 2 for a total of 4 ports. A first RF chain couples to twelve first polarized antennas and a second RF chain couples to the corresponding twelve second polarized antennas within each dotted rectangle. Thus, in total, the 8T8R has 8 ports (T1-T8): 4 ports for the first polarized antennas and 4 ports for the second polarized antennas.

In FIG. 7A, the effective antenna is at a location within the partitions of the three antennas that corresponds to the center of the partition. For example, in the grouping set of the three antennas 7-4, the center of this set of three antennas is the location 7-7 corresponding to the effective antenna for the set of the three antennas 7-4. Similarly, in the grouping set of the three antennas 7-5, the center of this set of three antennas is the location 7-8 corresponding to the effective antenna for the set of the three antennas 7-5, and in the grouping set of the three antennas 7-6, the center of this set of three antennas is the location 7-9 corresponding to the effective antenna for the set of the three antennas 7-6. Assume that the spacing between antennas in the antenna array is a distance Γ. That is, the horizontal distance between two adjacent antennas is Γ and that the vertical distance between two adjacent antennas is also Γ. The effective antenna distance may be the same or larger. For example, the horizontal effective antenna distance between the location 7-7 of the set of the three antennas 7-4 and the location 7-8 of the set of the three antennas 7-5 is the distance Γ. However, the vertical effective antenna distance between the location 7-8 of the set of the three antennas 7-5 and the location 7-9 of the set of the three antennas 7-6 is the distance 3Γ. In this case, the vertical effective antenna distance is three times greater than the horizontal effective antenna distance. The horizontal effective distance being the same as the spacing between antennas in the antenna array.

In FIG. 7B, the effective antenna is at a location within the partitions of the twelve antennas which corresponds to the center of the partition. For example, in the grouping set of the twelve antennas 7-10, the center of this set of twelve antennas is the location 7-14 corresponding to the effective antenna location for the set of the twelve antennas 7-10. Similarly, in the grouping set of the twelve antennas 7-11, the center of this set of twelve antennas is the location 7-15 corresponding to the effective antenna for the set of the twelve antennas 7-11, in the grouping set of the twelve antennas 7-12, the center of this set of twelve antennas is the location 7-16 corresponding to the effective antenna for the set of the twelve antennas 7-12 and in the grouping set of the twelve antennas 7-13, the center of this set of twelve antennas is the location 7-17 corresponding to the effective antenna for the set of the twelve antennas 7-13. Assume that the spacing between antennas in the antenna array is a distance Γ. That is, the horizontal distance between two adjacent antennas is Γ and that the vertical distance between two adjacent antennas is also Γ. The effective antenna distance may be the same or larger. For example, the horizontal effective antenna distance between the location 7-14 of the set of the twelve antennas 7-10 and the location 7-15 of the set of the twelve antennas 7-11 is the distance 2Γ.

However, the vertical effective antenna distance between the location 7-15 of the set of the twelve antennas 7-11 and the location 7-17 of the set of the twelve antennas 7-13 is the distance 6Γ. In this case, the vertical effective antenna distance is three times greater than the horizontal effective antenna distance. The horizontal effective distance being twice the spacing between antennas in the antenna array.

The significance of this is as follows. A single antenna element in an array has a specific pattern. If a port is connected to multiple antenna elements, that generates an "effective element pattern" which is different from that produced by the single antenna element. For example, the overall scan angle for the multiple connected antenna elements is reduced and sidelobes are typically introduced. In addition, the unequal spacing of the antenna element in the horizontal and vertical direction of the antenna array also contributes to unwanted sidelobes.

Figure 8:
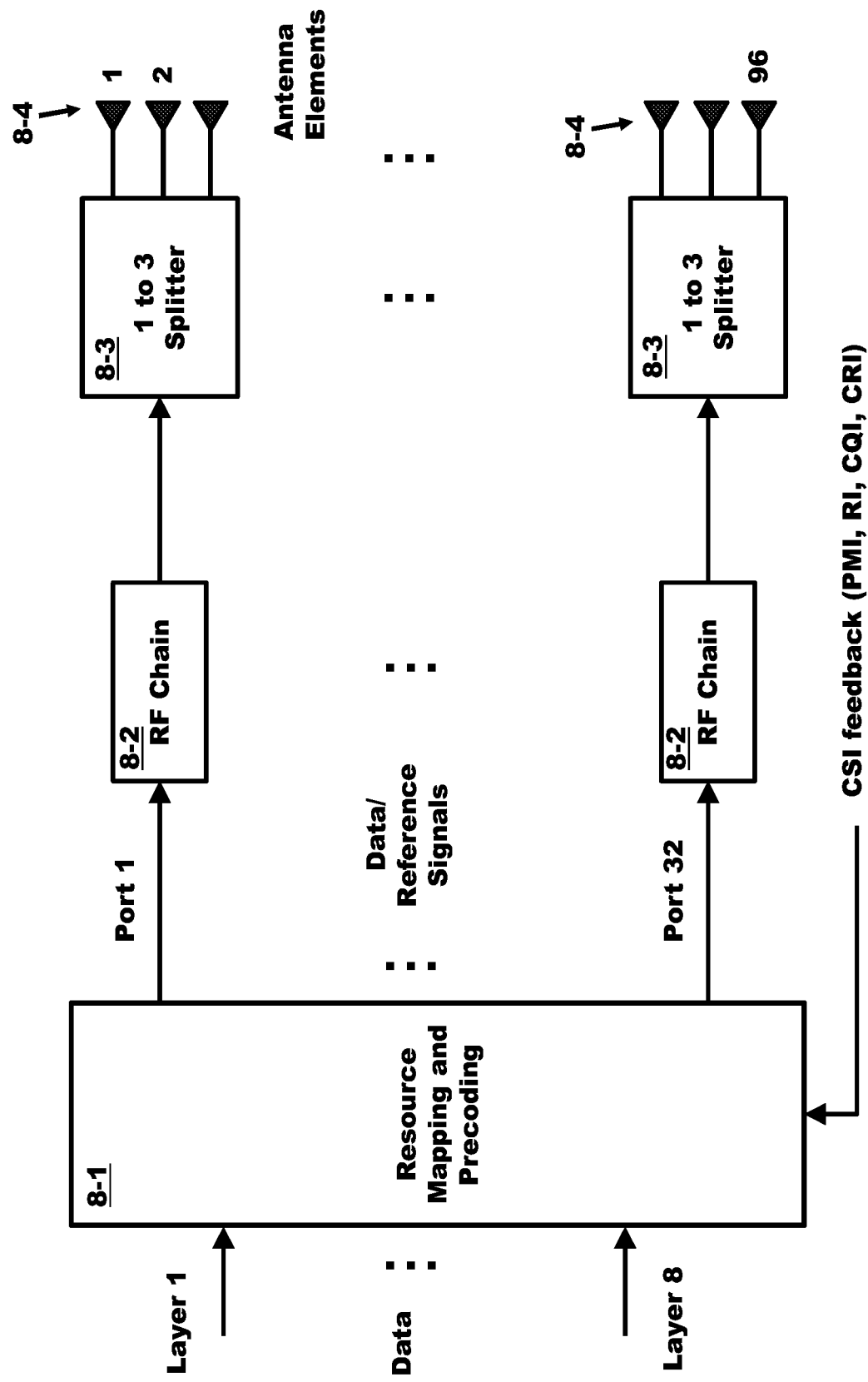
FIG. 8 depicts a block level system description for the base station of the conventional 32T32R configuration.

A block diagram of a conventional 32T32R (4, 4, 8, 4) system is illustrated in FIG. 8. Data to support 8 layers is coupled to the resource mapping and precoding (RMP) block 8-1 which generates 32 ports carrying the reference or/and data signals. The reference signals are used to sound the wireless communication channels between the ports in base station and the terminals. Once the channels between the base station and the terminals are characterized, the base station determines the best way to send data to the terminals. In this process, the system can use Class-A, Class-B, or a Hybrid CSI processes to characterize the channel.

Each port drives an RF chain 8-2 which implements various functions such as DAC (digital to analog conversion, up-conversion from IF Intermediate Frequency) to RF (Radio Frequency), and filtering, to name a few. Each RF chain, in turn, drives a 1-to-3 splitter 8-3 coupled to three antennas 8-4. The splitters 8-3 are basically corporate feeds (or their equivalent) for sending the same signal to each output of the splitter. The antennas radiate their pattern into their corresponding domain surrounding the base station. Because of antenna orthogonality, 16 ports drive a total of 48 normal antennas while the remaining 16 ports drive a total of 48 orthogonal antennas. The CSI feedback information from the one or more terminals based on the reference signals is sent back to the base station. The feedback is used to beamform the data from the 96 antennas of the MIMO antenna array to the terminals through the application of the identified corresponding precoding matrix.

Figure 9:
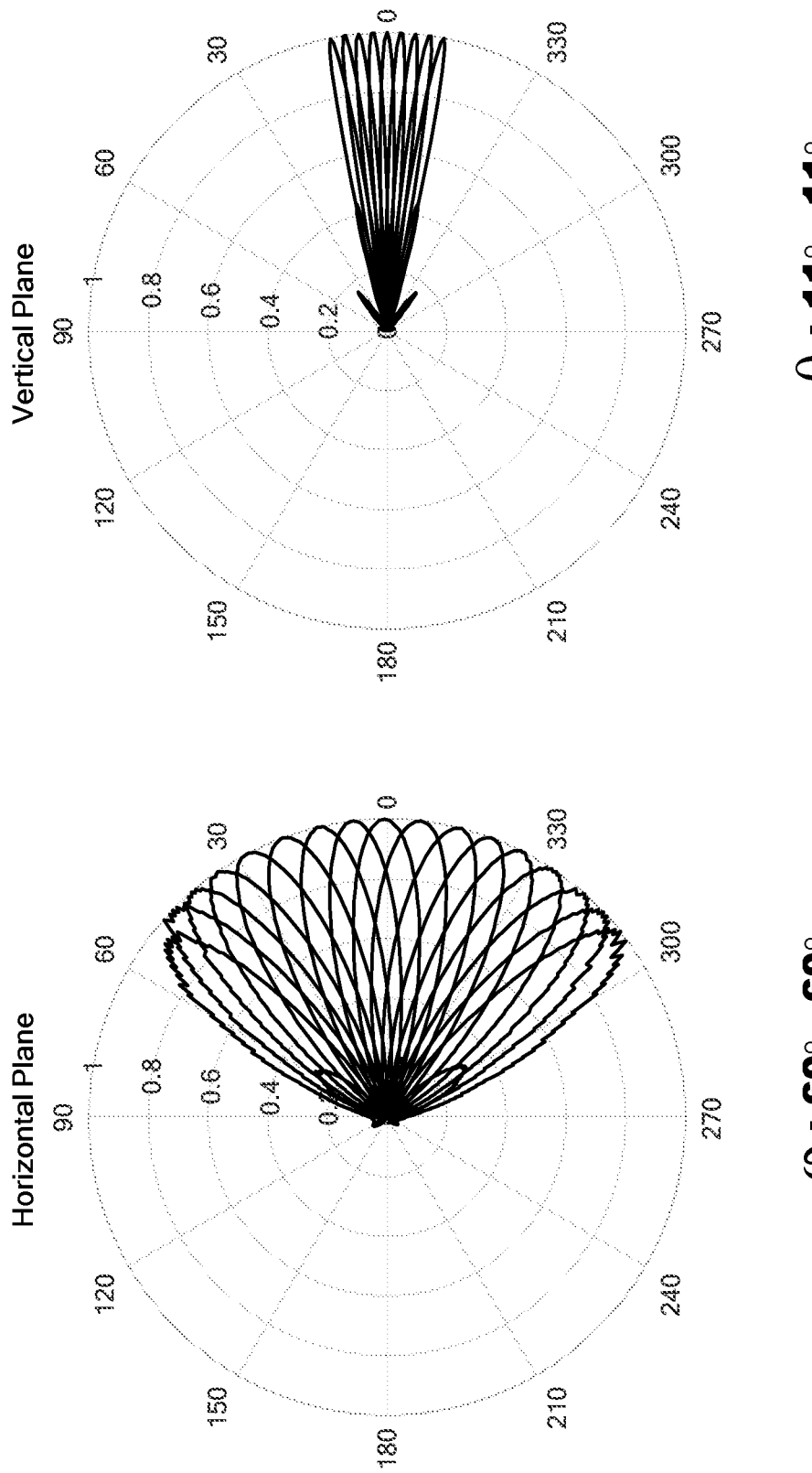
FIG. 9 shows the beams patterns in the horizontal and vertical planes for the conventional 32T32R configuration.

FIG. 9 illustrates the overall φ and θ angular spread of the beams generated by the conventional 32T32R (4, 4, 8, 4) system in the horizontal and vertical planes, respectively. The horizontal beams spread +/−60° which cover ⅓ of the horizontal region (120°) around a base station, if the base station is partitioned into three equal domains. In addition, these beams can be steered in the vertical direction over a range of +/−11° within the vertical plane of the domain. This domain substantially corresponds to the region 6-2 (see FIG. 6). The codebook of the 32T32R (4, 4, 8, 4) antenna system contains up to 512 different beam directions over its entire angular spread of +/−60° and +/−11°. The maximum scan angle or angular spread depends on the antenna element pattern, the antenna element spacing, and the number of antennas driven by each port.

Figure 10:
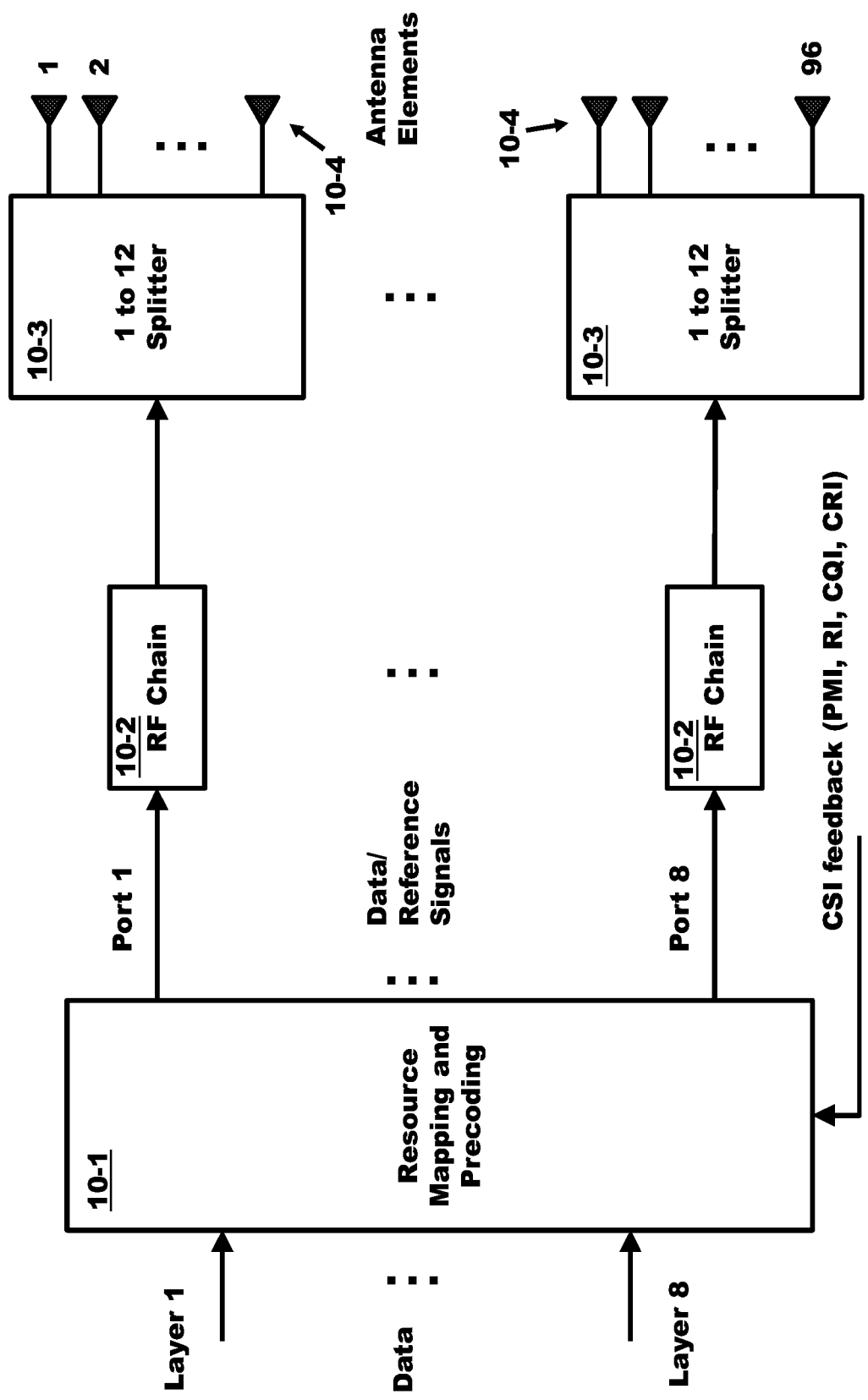
FIG. 10 depicts a block level system description for the base station of the conventional 8T8R configuration.

A block diagram of a conventional 8T8R (2, 2, 8, 8) system is illustrated in FIG. 10. Data to support 8 layers is coupled to the resource mapping and precoding block 10-1 which generates 8 ports, Port 1 to Port 8, carrying the reference or/and data signals. The system uses Class-A, Class-B, or Hybrid CSI processes and the block 10-1 also includes additional processing capabilities and control signals (not illustrated) to perform channel sounding and other processes required to operate a base station. Each port drives an RF chain 10-2. Each RF chain 10-2 drives a 1-to-12 splitter 10-3 which is then coupled to twelve antennas 10-4. Because of antenna orthogonality, 4 ports drive a total of 48 normal antennas; while the remaining 4 ports drive a total of 48 orthogonal antennas. The CSI feedback sent from the terminal to the base station is based on the reference signals that the terminals received from the base station. The CSI feedback which identifies the appropriate precoding matrix is used to beamform the data from the 96 antennas of the antenna array to the terminals that are in the domain of the base station. This system operates similar to the system illustrated by FIGS. 7B and 8 in which that the number of ports has been reduced by a factor of 4 (i.e., ¼) while the grouping of the antennas has been increased by a factor of 4 (i.e., each port drives 12 antennas instead of 3). The reduction in the number of ports affects the characteristics of the maximum angular spread of the beams that is achievable by the fixed array, as will be illustrated in the FIG. 11.

Figure 11:
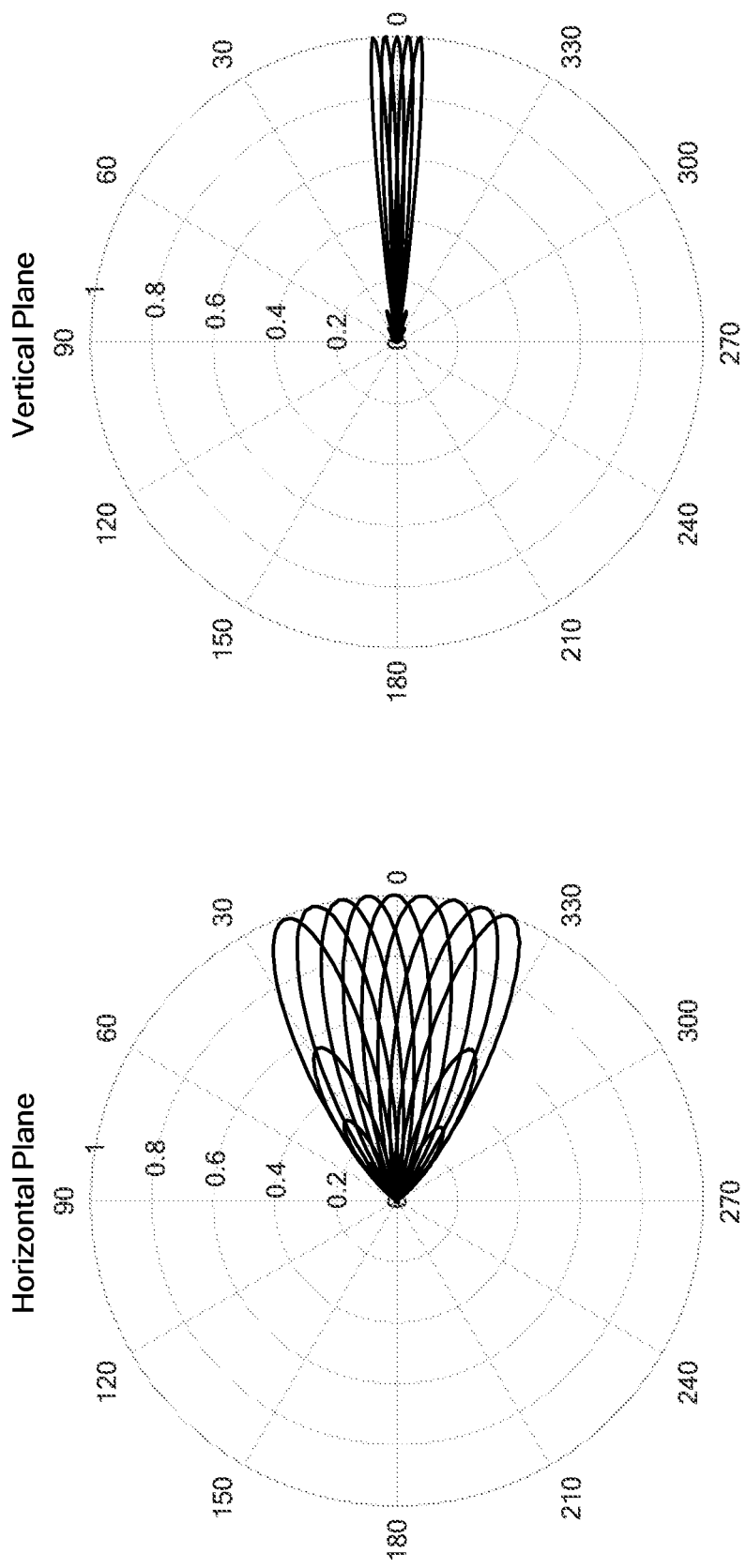
FIG. 11 depicts the beams patterns in the horizontal and vertical planes for the conventional 8T8R configuration.

FIG. 11 illustrates the overall φ and θ angular spread of the beams generated for the conventional 8T8R (2, 2, 8, 8) system in the horizontal and vertical planes, respectively. The horizontal beams spread +/−30° which cover ⅙ of the horizontal region (60°) around the base station. In addition, these beams can be steered in the vertical direction of +/−5.5° from the horizontal plane. This domain substantially corresponds to the smaller region 6-1 (see FIG. 6). The codebook for the 8T8R (2, 2, 8, 8) antenna system contains up to 256 beam directions over its entire angular spread. The angular spread of the 8T8R (2, 2, 8, 8) antenna system has been reduced by approximately half in both the horizontal (from +/−60° to +/−30°) and vertical (from +/−11° to +/−5.5°) directions when compared to the 32T32R (4, 4, 8, 4) system. When the 8T8R (2, 2, 8, 8) antenna system attempts to perform the Class-A, Class-B, or Hybrid CSI processes, only ¼ of the (½ of the horizontal times ½ of the vertical) angular spread is covered. Thus, reducing the port count from 32 (in the 32T32R antenna system) to a port count of 8 (in the 8T8R antenna system) causes a reduction in the angular spread by ½ in each of the horizontal and vertical directions.

A Method for Channel Sounding

Figure 12A:
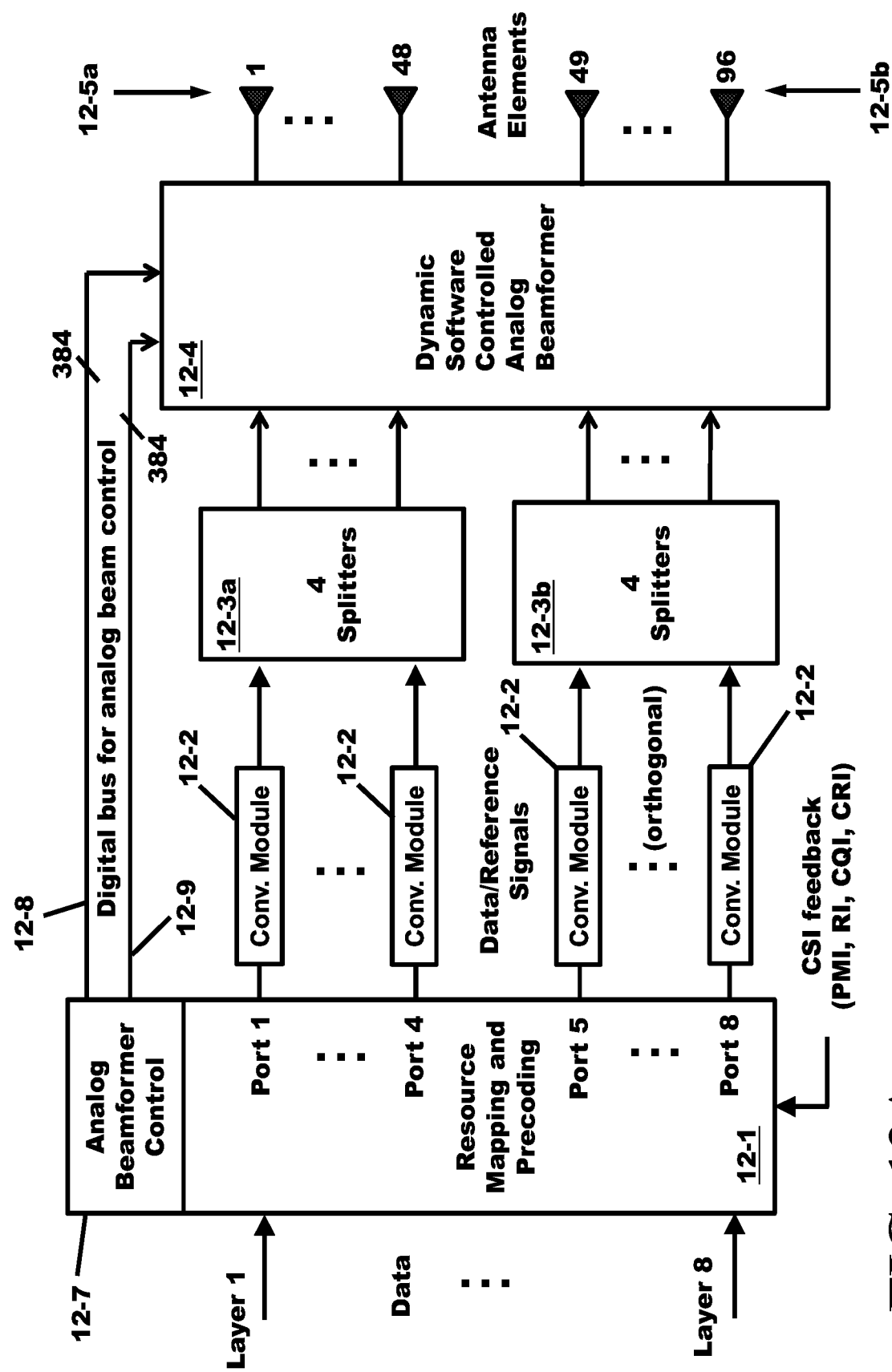
FIGS. 12A and 12B show a block level representation of an embodiment of a modified 8T8R configuration with a digital bus for analog beam adjustment.

FIG. 12A illustrates a block diagram of an embodiment of a modified 8T8R system that overcomes the problems associated with reducing the number of ports and which addresses the smaller angular spread associated with a conventional 8T8R antenna system. In general, the modified 8T8R system employs an active antenna array system that is capable of connecting each beam signal for a given polarity to each and every antenna element of that polarity and to independently control the analog phase shifts and analog gains applied to each signal that is delivered to an antenna element. In the described embodiment, a resource mapping and precoding (RMP) block 12-1 receives 8 layers and generates eight ports, Port 1 to Port 8, therefrom. The eight ports carry the reference or data signals. Four of the eight ports, namely, Port 1 to Port 4, are coupled through corresponding conversion blocks 12-2 to a splitter block 12-3a which distributes those signals to 48 antenna elements. The splitter block 12-3a operates on each of the port signals and for each port signal outputs 48 signals, each for a different one of the 48 antenna elements. The remaining four ports, namely Port 5 to Port 8, are coupled through another set of corresponding conversion bocks 12-2 to a second splitter block 12-3b which, in turn, distributes those signals to the 48 orthogonal antenna elements. The splitter block 12-3b operates on each of the port signals and for each port signal outputs 48 identical signals, each for a different one of the 48 orthogonal antenna elements. In other words, in this embodiment, the splitter block 12-3*a* is capable of outputting 192 signals, four signals for each of the 48 antennas 12-5*a* and splitter block 12-3*b* is capable of outputting 192 signals, four signals for each of the 48 antennas 12-5*b*. The conversion blocks 12-2, which are part of the previously referred to RF chains for each port signal, each implement various functions such as DAC (digital to analog conversion, up-conversion from IF (Intermediate Frequency) to RF (Radio Frequency), and filtering, etc.

The 384 signals from the splitters 12-3*a* and 12-3*b* pass to a dynamic software controlled analog beamformer block 12-4 which outputs 96 drive signals, one for each of the 96 antenna elements 12-5. The analog beamformer block 12-4 applies analog phase shifts and magnitude weights to each of the 382 signals received by the beamformer block, combines the phase and amplitude weighted signals appropriately, and provides the combined signals to corresponding power amplifiers for each of the 96 antennas 12-5*a* and the 96 antennas 12-5*b*. Because of the high number of signal paths through the splitters 12-3*a* and 12-3*b* and through the analog beamformer block 12-4, it is not possible to show these signal paths in FIG. 12A.

Figure 12B:
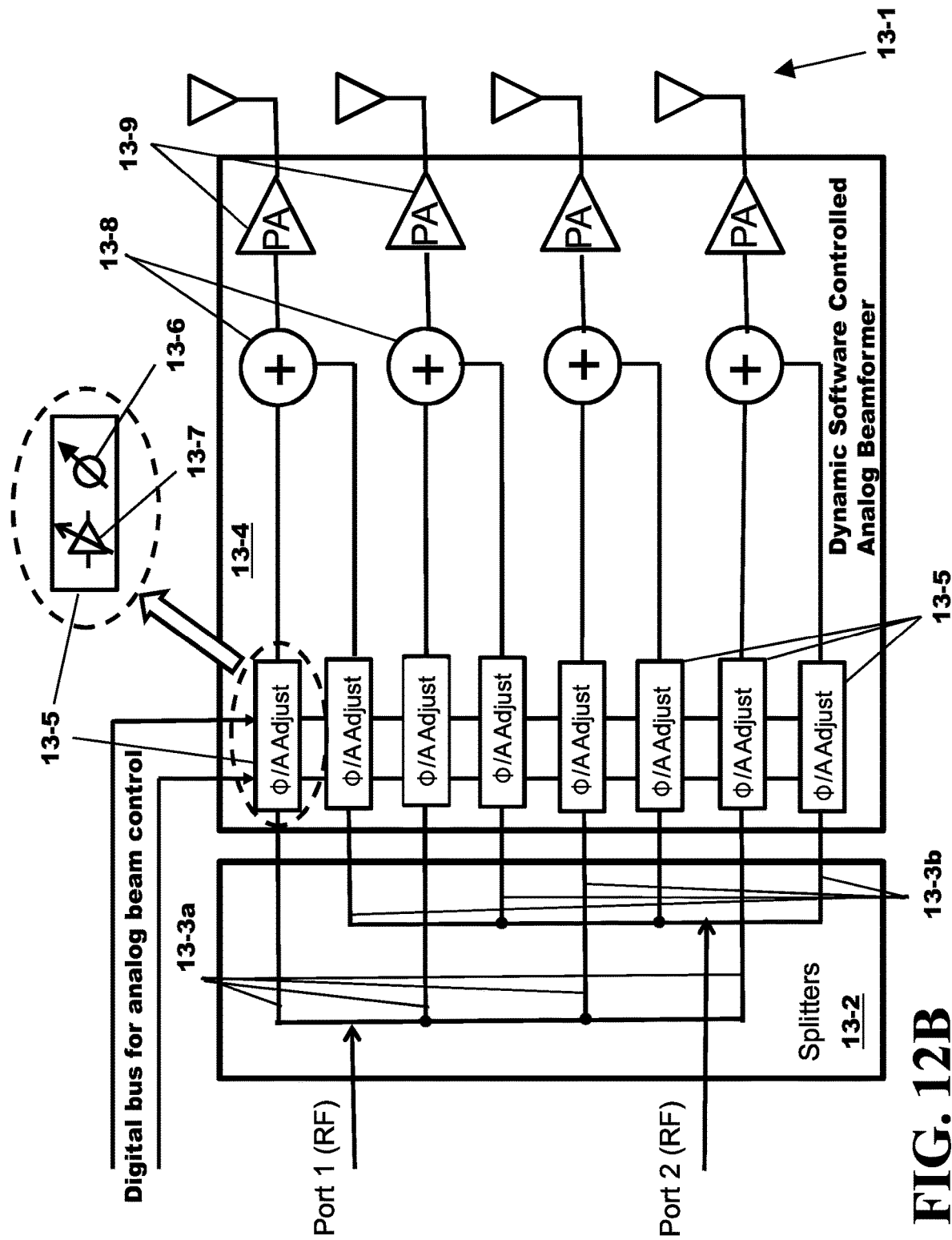

To reduce the complexity so that the signal paths can be explicitly shown, we refer to FIG. 12B which illustrates an embodiment in which two port RF signals (Port 1 and Port 2) are delivered to four antenna elements 13-1. In this greatly simplified example, the splitter block 13-2 distributes the Port 1 signal to four output lines 13-3*a*, one for each of the four antennas 13-1; and it distributes the Port 2 signal to four different output lines 13-3*b*, one for each of the four antennas 13-1. Those output signals from the splitters 13-2 are each processed by a dynamic software controlled analog beamformer 13-4. Each signal passes through a corresponding phase/amplitude adjustment block 13-5 in the analog beamformer 13-4. Each phase/amplitude adjustment block 13-5 includes a digitally controlled, phase shifter 13-6 and a digitally controlled, programmable gain amplifier (PGA) 13-7. Each phase/amplitude adjustment block 13-5 applies a digitally controlled phase shift and gain to its corresponding input signals. There is a signal combiner 13-8 before each antenna element which sums the phase and amplitude adjusted Port 1 and Port 2 signals and supplies that combined signal to a power amplifier (PA) 13-9 driving a corresponding antenna 13-1. As should be apparent, the arrangement enables one to generate through the array of antennas 13-1 two independently steerable and independently shaped transmit beams, one for the Port 1 signal and the other for the Port 2 signal. The system shown in FIG. 12A operates in the same way, except that there are eight Port signals instead of two and 98 antenna elements in the array instead of four (48 with one polarization and 48 with an orthogonal polarization).

Referring again to FIG. 12A, an analog beamformer control section 12-7 located in the resource mapping and precoding block 12-1 generates digital signals for controlling the phase shifters and PGAs in the analog beamformer 12-4. Two digital control busses 12-8 and 12-9 connect the analog beamformer control section 12-7 to control the analog beamformer 12-4. The digital control signals sent over those control buses set the analog phases and gains applied by the digitally controlled, phase shifters 13-6 and the digitally controlled, programmable gain amplifiers (PGA) 13-7. The resource mapping and precoding block 21-1 receives a CSI feedback sent by the terminals based on the pilot or reference signals that were sent by the bases station during channel sounding. The CSI feedback is used by the base station to beamform the data from the 96 antennas of the antenna array to the terminals that are in the domain of the base station.

In the described embodiment, since each port signal is mapped to a sub-array of antenna elements, the dynamic software controlled analog beamformer 13-4 sets the amplitude gains for all of the rest of the antenna elements for that port (i.e., for the other sub-arrays) signal to zero. In other words, the AAS is configured (by appropriately setting the analog phases and gains) so that each port signal goes to its corresponding sub-array within the overall antenna array.

Further details about active array systems can be found in U.S. Patent Publication 2017/0077613 by Mihai Banu, and Yiping Feng, "Active Array Calibration", published Mar. 16, 2017, the disclosure of which is incorporated herein by reference in its entirety.

From a high-level perspective, the operation of the system can be described in mathematical terms as follows. Assume a conventional MIMO system which maps each port signal to multiple antennas within a corresponding different sub-array. In other words, each antenna element in a sub-array receives the same signal as the other antenna elements within that sub-array, as is illustrated by FIGS. 8 and 10. In such a system, when the base station transmits a data vector s with size of L×1, where L is the number of layers, it multiplies this vector by a digital precoder or PMI matrix, $F_D$, with size of P×L, where P is the number of ports. The PMI matrix is obtained from the UE feedback. It then multiples that result by an analog weights matrix, $F_A$, with size of N×P, where N is the number of transmit antennas. This is the function performed by the splitters that map the ports to the antenna elements. In this case, $F_A$ is a fixed matrix (i.e., the matrix elements are constants). So, the operation of the system can be represented as follows:

$$x = F_A F_D s$$

Now assume there is an analog beamformer between the splitters and the antenna elements, as is illustrated by FIG. 12. Recall that the analog beamformer is able to adjust the phase shift and amplitude or gain of each signal that is sent to an antenna element to thereby perform a beamforming function in the analog domain. In this case, the analog weights matrix, $F_A$, is not fixed but rather represents the phase shifts and variable gains that can be applied to each signal.

Note that in this active array system each port signal can be sent to every antenna element of the corresponding polarization. However, to implement the MIMO configuration illustrated by FIG. 7B, each port signal is in practice sent to only the antenna elements in the corresponding sub-array. That is, each port signal is sent to only 12 of the 48 antenna elements for that polarization. That means the gains for all of the other paths for the port signal are set to zero.

Even though the precoding matrices for the 8T8R limit the maximum scan angle achievable by the conventional 8T8R MIMO, the ability to steer the beams generated by each sub-array within the modified 8T8R array by using the analog phase weights enables one to cover the larger scan angles that are achievable by MIMO arrays with a larger numbers of ports (e.g. a conventional 32T32R MIMO array). This is done by directing the analog generated main beams to the centers of the sub-sectors (or sub-regions) that make up the larger sector or domain.

Note that if the horizontal and vertical phase shifts are set equal to zero for the entire array of 96 antennas, the beams that can be formed by this modified 8T8R antenna system via the precoding matrices for the 8T8R MIMO system would have the patterns shown in FIG. 11. They would extend horizontally from +/−30° for a total horizontal range of 60° and they would extend vertically from +/−5.5° for a total vertical range of 11°. This domain corresponds to region 6-1 shown in FIG. 6 which represents about ¼ of the maximum coverage area that is achievable by a conventional 32T32R MIMO array.

Figure 15:
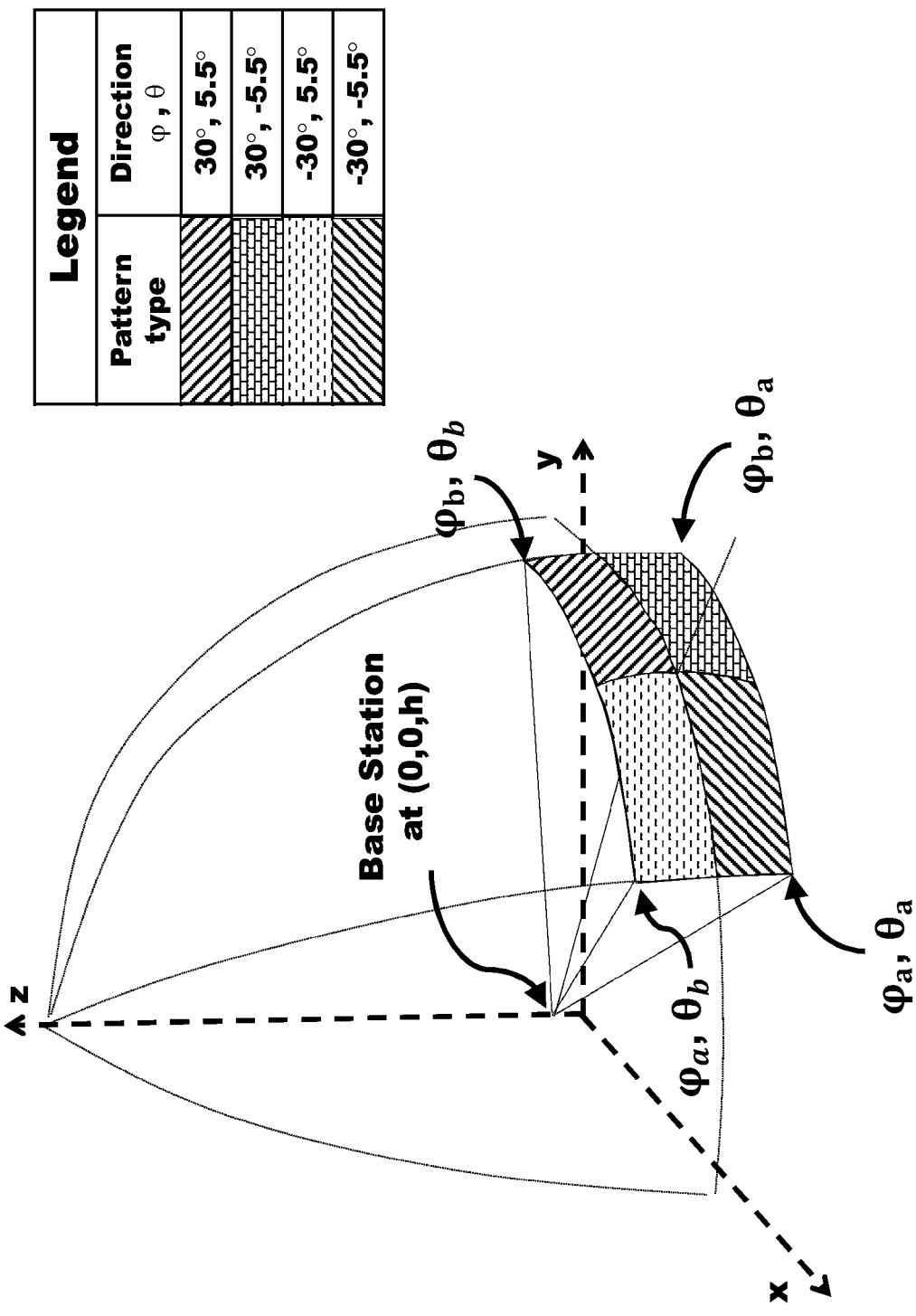
FIG. 15 shows the angular spread of the four beam patterns corresponding to the first, second, third, and fourth time intervals.

But since the analog phase shifts that are applied to each of the signals being fed to each of the 96 antenna elements in the modified 8T8R MIMO can be individually controlled, the beam patterns that are generated for those signals can be shifted. So, for example, by setting the analog phase shifts for the antenna elements during time period $t_1$ so that each sub-array generates a beam that is directed toward 30° and 5.5°, then the entire beam pattern that is achievable by the precoding matrices for the 8T8R MIMO system shifts is shown in the top row of FIG. 13. That is, the resulting beam pattern that is achievable by the precoding matrices extends horizontally from 0° to 60° and vertically from 0° to 11°. In other words, it is the same pattern as that generated in FIG. 11 but shifted by 30° and 5.5° in the $\varphi$ and —0 directions, respectively. This angular coverage is graphically depicted in FIG. 15 as the cross-hatched pattern indicated by the legend direction 30°, 5.5°.

Figure 13:
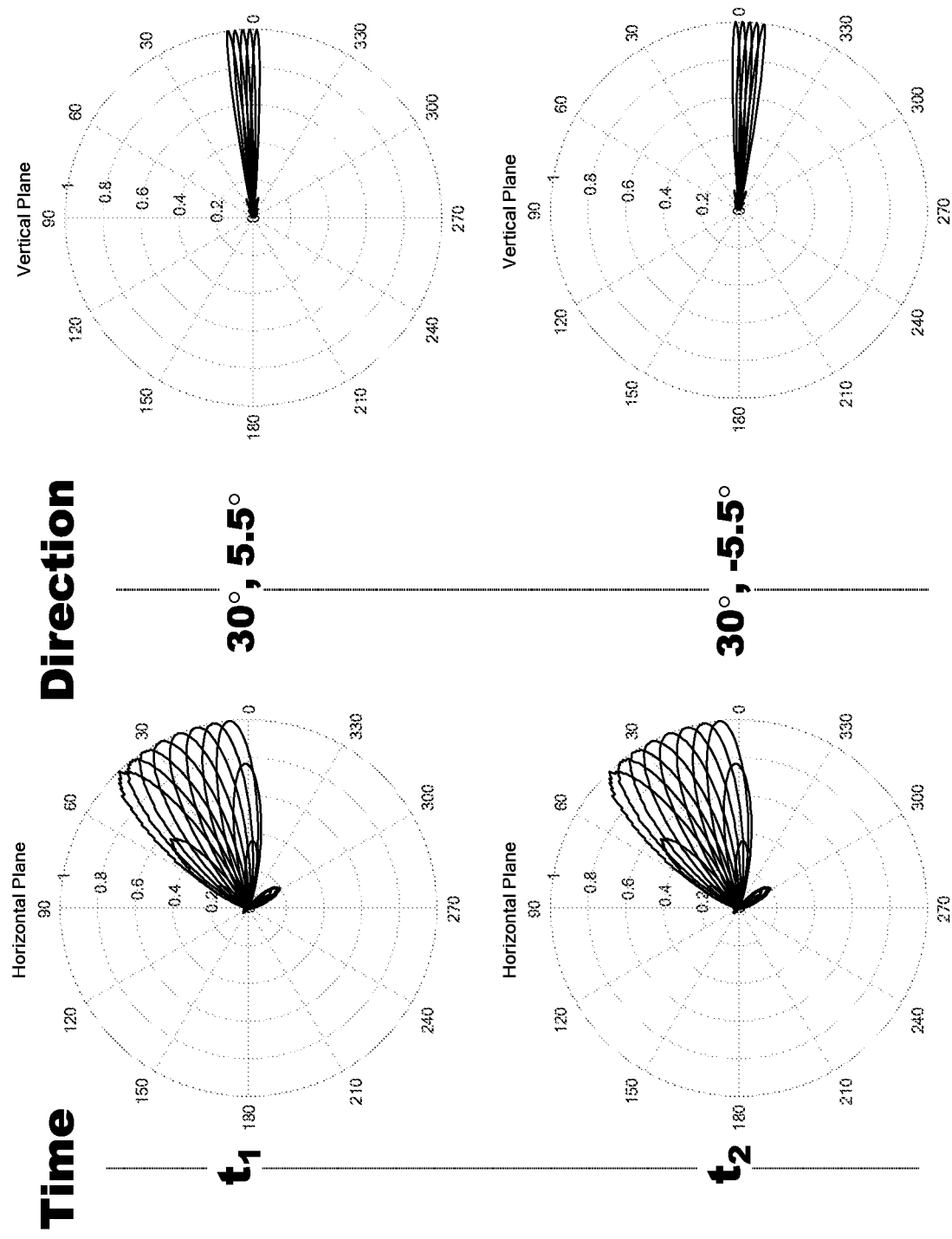
FIG. 13 depicts the beams patterns in the horizontal and vertical planes for one embodiment of the modified 8T8R configuration with analog beam adjustment for a first and second time interval.

During next time period $t_2$, by setting the analog phase shifts for the antenna elements so that each sub-array generates a beam that is directed toward 30° and −5.5°, then the entire beam pattern that is achievable by the precoding matrices for the 8T8R MIMO is shown in the bottom row of FIG. 13. That is, the resulting beam pattern that is achievable by the precoding matrices extends horizontally from 0° to 60° and vertically from 0° to −11°. In other words, it is the same pattern as that generated in FIG. 11 but shifted by 30° and −5.5° in the $\varphi$ and $\theta$ directions, respectively. This angular coverage is graphically depicted in FIG. 15 as the cross-hatched pattern indicated by the legend direction 30°, −5.5°.

Figure 14:
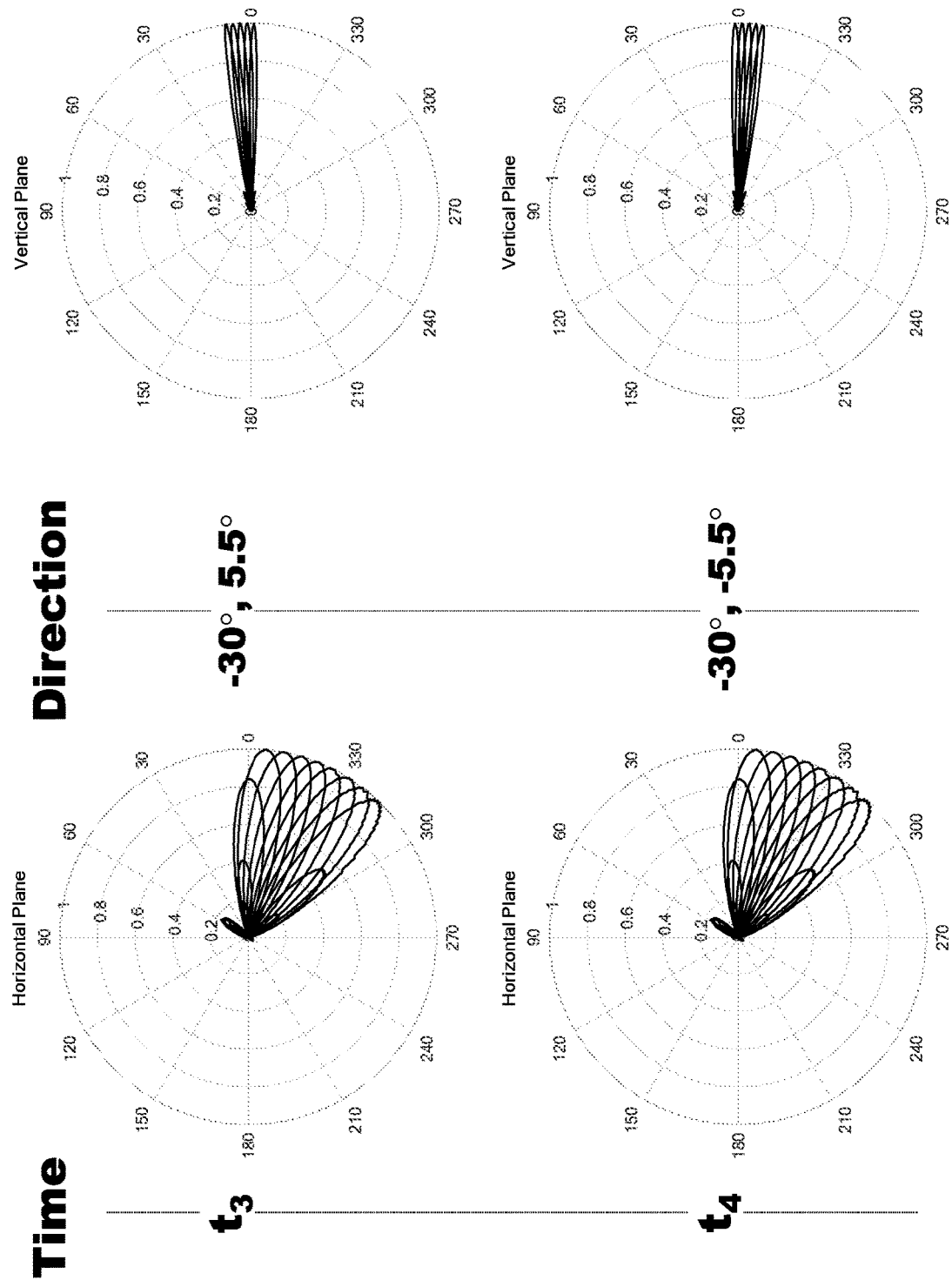
FIG. 14 depicts the beams patterns in the horizontal and vertical planes for one embodiment of the modified 8T8R configuration with analog beam adjustment for a third and fourth time.

During next time period $t_3$, by setting the analog phase shifts for the antenna elements so that each sub-array generates a beam that is directed toward −30° and 5.5°, then the entire beam pattern that is achievable by the precoding matrices for the 8T8R MIMO is shown in the top row of FIG. 14. That is, the resulting beam pattern that is achievable by the precoding matrices extends horizontally from 0° to −60° and vertically from 0° to 11°. In other words, it is the same pattern as that generated in FIG. 11 but shifted by −30° and +5.5° in the $\varphi$ and $\theta$ directions, respectively. This angular coverage is graphically depicted in FIG. 15 as the cross-hatched pattern indicated by the legend direction −30°, 5.5°.

Finally, during time period $t_4$, by setting the analog phase shifts for the antenna elements so that each sub-array generates a beam that is directed toward −30° and −5.5°, then the entire beam pattern that is achievable by the precoding matrices for the 8T8R MIMO is shown in the bottom row of FIG. 14. That is, the resulting beam pattern that is achievable by the precoding matrices extends horizontally from 0° to −60° and vertically from 0° to −11°. In other words, it is the same pattern as that generated in FIG. 11 but shifted by −30° and −5.5° in the $\varphi$ and $\theta$ directions, respectively. This angular coverage is graphically depicted in FIG. 15 as the cross-hatched pattern indicated by the legend direction −30°, −5.5°.

In LTE within the 3GPP standard, for instance, each time period has a sub-frame of duration 1 ms. The total angular spread of all four time periods ($t_1$, $t_2$, $t_3$, and $t_4$) summed together equals +/−60° horizontally and +/−11° vertically and requires 4 sub-frames to complete the process for a total of 4 ms. This is the same angular coverage as illustrated in FIG. 9 which corresponds to the 32T32R (4, 4, 8, 4) antenna system using 32 ports which is performed in one sub-frame. However, the embodiment presented in the present application uses an 8T8R (2, 2, 8, 8) antenna system using only 8 ports and offers the same coverage area as the 32T32R (4, 4, 8, 4) antenna system. This result is due to the application of the conventional digital Class-A, Class-B, or Hybrid CSI methods combined with the analog shift of the entire set of beams in one or both of the horizontal and vertical directions. In other words, during each time period with the beams directed by means of the analog weights to the corresponding center of the sub-sector, channel sounding is performed. As a consequence, during each successive time period, the terminal will return the PMI, CQI, and RI for that time period. After collecting this information for all of the time periods that are required to cover the complete domain (i.e., four time periods in the case of the modified 8T8R MIMO system operating to meet the performance of a conventional 32T32R MIMO system), then the base station is able to identify the sub-sector and the best PMI for that sub-sector that yields the best results.

Figure 16:
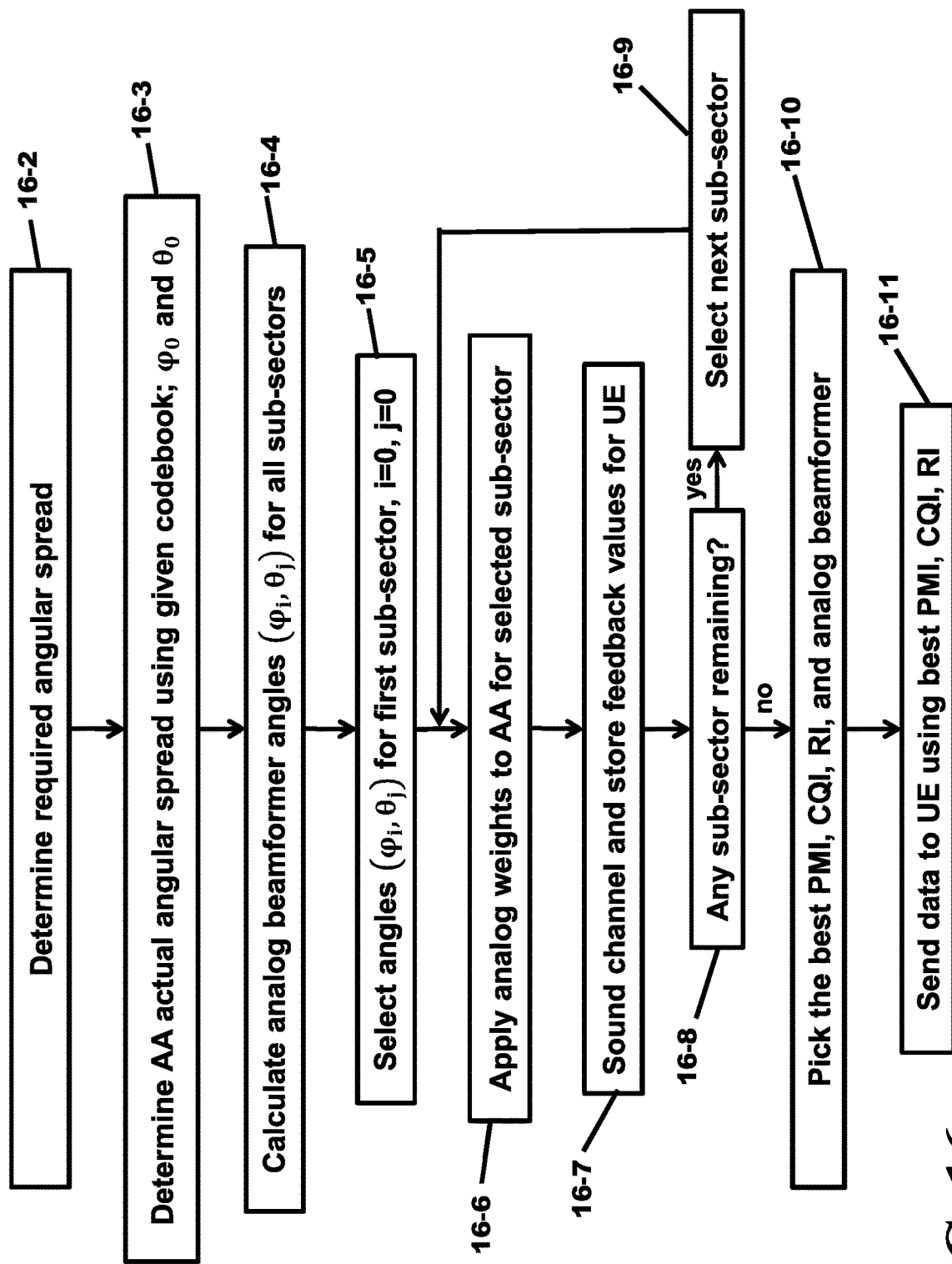
FIG. 16 depicts a flow chart presenting the process of selecting and applying the codebook weight values to an antenna array.

FIG. 16 presents a flow chart for operating a modified 8T8R MIMO active antenna array implementing the configuration depicted in FIG. 7B, to improve channel sounding capabilities and capacity. More specifically, the method is for enabling a modified 8T8R MIMO active antenna array to cover a domain that a conventional MIMO array with higher port count is capable of covering.

The initial steps involve determining the extent of the larger domain that can be serviced by a conventional MIMO array with a higher port count, determining the smaller size of the sub-region that can be covered by a MIMO array with a lower port count, and identifying the number and locations (i.e., the centers) of the sub-regions required to cover the entirety of the larger domain. In essence, the objective is to find the number of different scans that will be needed to cover the required scan angle by using an antenna with fewer ports.

First, determine the maximum horizontal and vertical scan angle (or maximum angular spread) that the conventional MIMO array is capable of servicing (step 16-2). This can be determined, for example, from the appropriate codebook for the given port count and configuration. Let this range be represented by the values: $\varphi_a$, $\varphi_b$, where $\varphi_a < \varphi_b$ and $\theta_a$, $\theta_b$ where $\theta_a < \theta_b$ in horizontal and vertical planes (see FIG. 15).

Next, determine the maximum horizontal and vertical scan angles for the modified active antenna array. This also can be determined from the appropriate codebook for the given port count and configuration. And let these be represented by the values: $\varphi_h$ and $\theta_v$, where $\varphi_h$ is a horizontal dimension and $\theta_v$ is a vertical dimension.

Next, calculate the analog beamformer angles for all of the sub-sectors (step 16-4). Do this by first computing the numbers $n_\varphi$ and $n_\theta$ as follows:

$$n_\varphi = [(\varphi_b - \varphi_a - \varphi_h)/\varphi_h]_{LCE} \qquad \text{EQU (1)}$$

and $$n_\theta = [(\theta_b - \theta_a - \theta_v)/\theta_v]_{LCE} \qquad \text{EQU (2)}$$

where $[\ldots]_{LCE}$ means largest closest integer.

Then, use these numbers to calculate delta values $\varphi_\Delta$ and $\theta_\Delta$ where, $$\varphi_\Delta = [(\varphi_b - \varphi_a - \varphi_h)/n_\varphi] \quad \text{EQU (3)}$$

and $$\theta_\Delta = [(\theta_b - \theta_a \theta_v)/n_\theta] \quad \text{EQU (4)}$$

Next, calculate the locations of each sub-sector $(\varphi_i, \theta_i)$ as:

$$(\varphi_i, \theta_i) = (\varphi_a + \varphi_h/2 + i\varphi_\Delta, \theta_a + \theta_v/2 + j\theta_\Delta) \quad \text{EQU (5)}$$

for $i=0, \ldots, n_\varphi$, $j=0, \ldots, n_\theta$.

After those calculations are completed, the analog weights corresponding to each main beam direction $(\varphi_i, \theta_j)$ for $i=0, \ldots, n_\varphi$, $j=0, \ldots, n_\theta$ are determined. These are the analog weights that will cause the active array to direct the beams for each sub-array toward the center of the corresponding sub-sector. These just-described steps can be performed at another time by an entity other than the base station and the results stored in a table that is referenced during the channel sounding phase the description of which follows.

After the weights are determined, the base station performs channel sounding. This involves for the first time period selecting a first sub-sector (i=0, j=0) (step 16-5), applying the corresponding analog weights to the active array to direct its beams towards the center of the selected sub-sector (step 16-6), and sounding the channel by sending the reference signals to the terminal(s) (step 16-7). During the channel sounding, the CSI-RS transmission that is used can be Class A, Class B, or a combination of the two, as previously described. The base station stores the values that are fed back to it by the terminal(s), including the PMI, CQI, and RI for that time period.

Upon completing the first cycle of channel sounding, the base station determines whether any sub-sectors that have not been sounded remain (step 16-8). If unsounded sub-sectors remain, in the next time period the base station selects the next sub-sector (step 16-9) and repeats the above-described sequence of steps.

After the base station has sounded all sub-sectors, it records the analog beamformer weights for the best sub-sector and picks the best reported PMI for that sub-sector along with the reported CQI and RI (step 16-10). It then uses these values to communicate with the terminal (step 16-11).

According to one approach to communicating with the terminal, the base station sets the analog weights in the active array so that each sub-array within that active array defines a main beam direction that is aimed at the center of the selected subsector. And it maps the layers to the port signals by using the precoding matrix identified by the best reported PMI.

Figure 17:
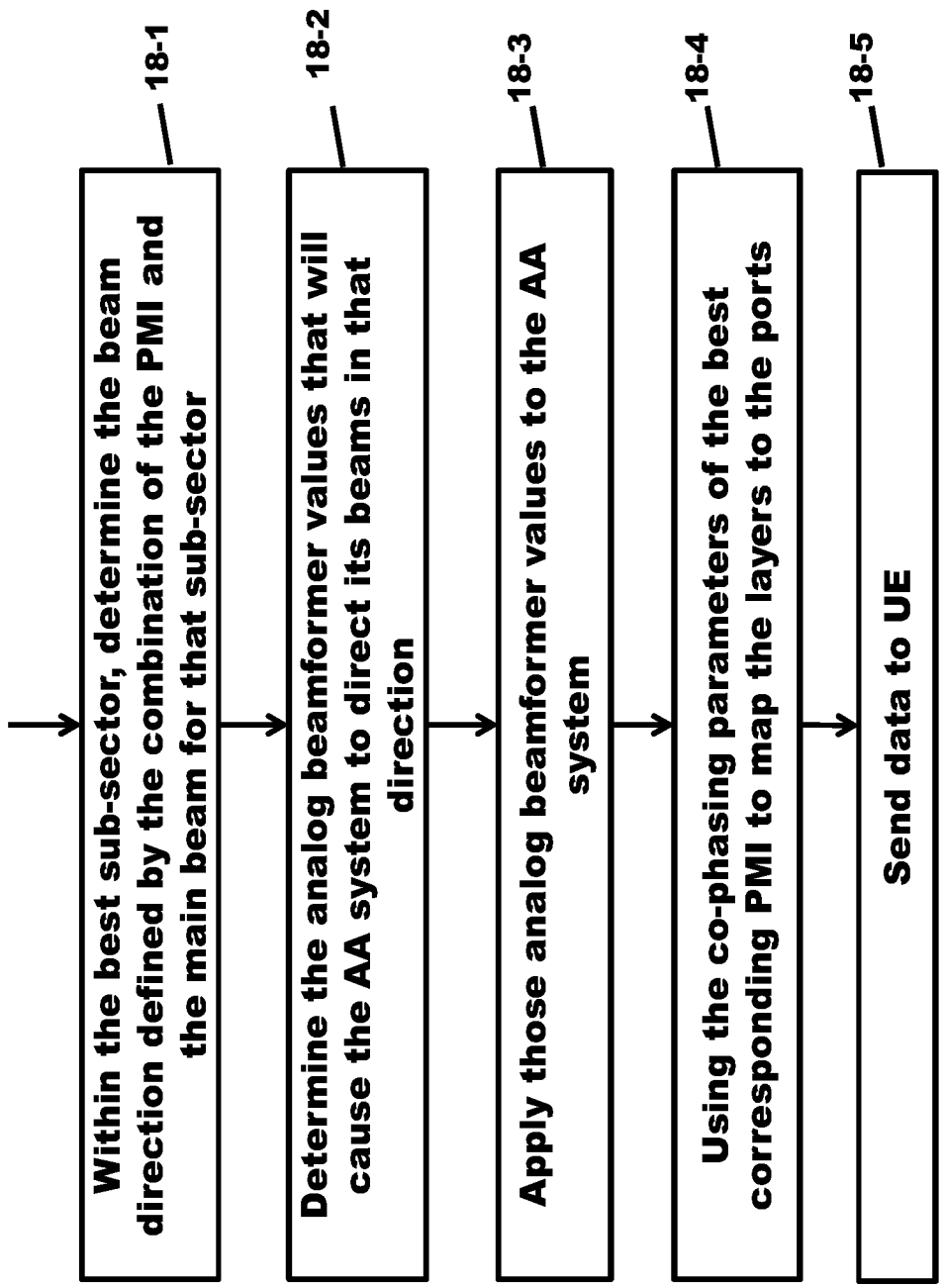
FIG. 17 shows a flow chart to remove the distortion in the beam pattern due to the analog beamformer.

An alternative approach which yields better results is shown in FIG. 17. Referring back to the previous characterization of the transfer function of the active array, recall that:

$$x = F_A F_D s$$

According to the alternative approach, the location of the terminal with which communication is being established is identified. In other words, the direction of the beam that is generated by the combination of the analog and digital precoders represented by $F_A F_D$ is identified (e.g. the $\phi$, $\theta$ direction along which the terminal is located) (step 18-1). This corresponds to the location or direction of the terminal. Then, an analog beamformer, $F_T$, for the active array system is determined. This is the transform according to which only analog phase weights and gains are used to direct beams in that direction, $\phi$, $\theta$. In this case, no beamforming precoding matrix $F_D$ is employed but rather it is, in essence, an identity matrix which might only include appropriate co-phasing parameters (step 18-2). In other words, this is a system in which the transfer function is now characterized by:

$$x = F_T s$$

Knowing $F_A$ and $F_D$, it is straight forward to determine $F_T$. This can be done a priori for each sub-sector and for each permitted direction within that sub-sector; and that precomputed information is stored in a lookup table. In other words, a lookup table is generated and stored which maps all possible $F_A F_D$ to a new $F_T$.

To communicate with the terminal, the base station applies that analog beamformer $F_T$ within the active array (step 18-3) and also uses, if required, the appropriate co-phasing parameters to map the layers to the ports (step 18-4). As noted above, the co-phasing parameters are used to change the phase rotation between two polarizations. In general, both polarizations have the same beam direction, but there is a phase difference between two polarizations adjusted by the co-phasing parameter.

With the active array configured in that way, the base station then sends the data (i.e., the port signals) to the terminal over beams directed towards the location of the terminal or UE (step 18-5). This is done without using any precoding matrices to perform beamforming in the digital domain.

In summary, by using the approach involving both the digital precoder and the analog beamformer, the base station can improve the scan angle as described. However, by using the approach illustrated by FIG. 17, in which beamforming is achieved by only using the analog beamformer (or analog precoder), the base station can also improve the quality of the beams that are generated. More specifically, the approach represented by FIG. 17 removes unwanted side-lobes from the beam pattern.

Figure 18:
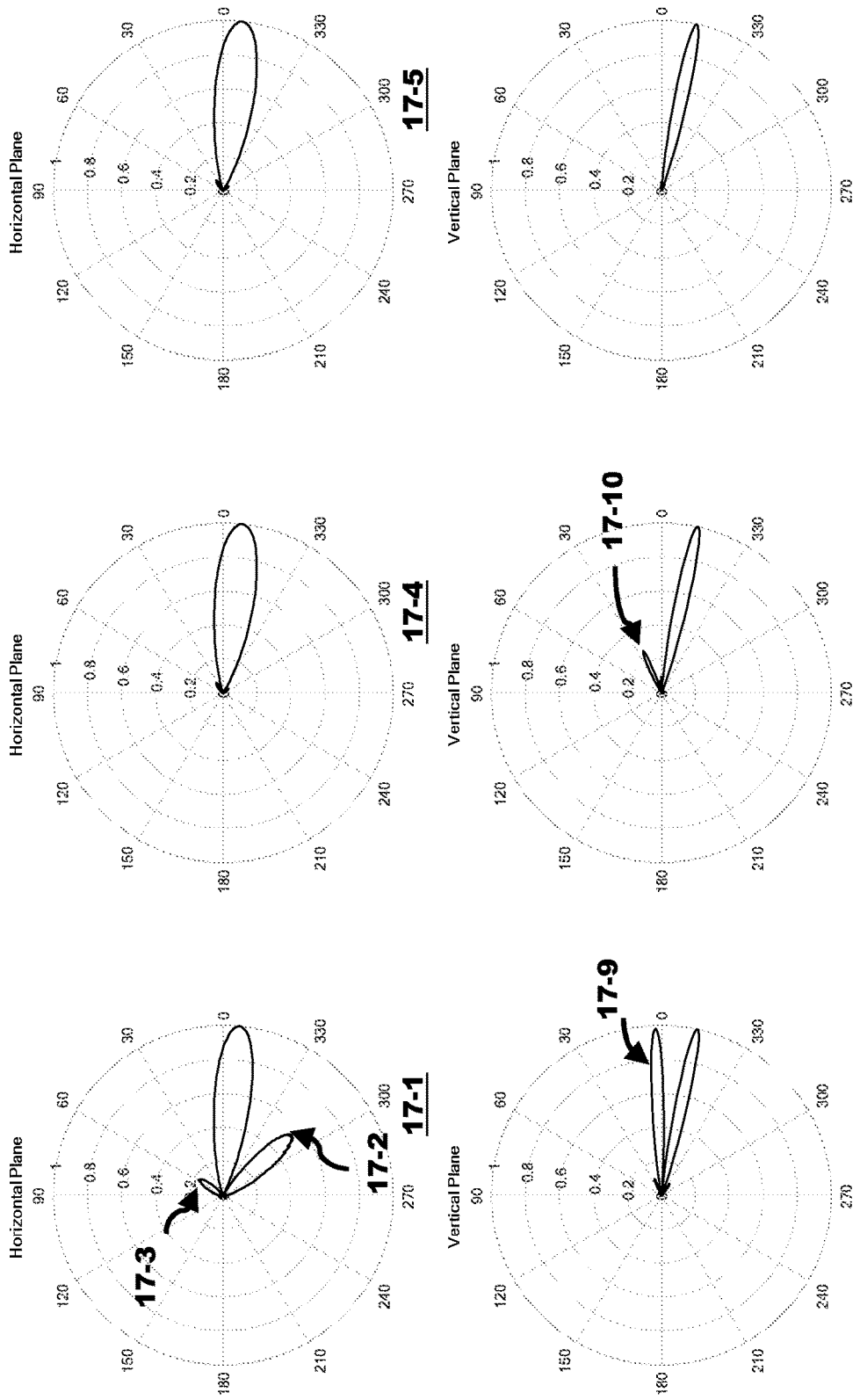
FIG. 18 depicts a distortion and removal of distortion in both the horizontal and vertical beam patterns for the conventional 8T8R, conventional 32T32R and the modified 8T8R methods.

FIG. 18 visually compares the results achievable by the different approaches. The three columns present the beam patterns for a conventional 8T8R system, a conventional 32T32R system, and a modified 8T8R system, respectively. The first and second rows present the beam patterns in a horizontal plane and vertical plane, respectively. As indicated, the first plot 17-1 has two spurs 17-2 and 17-3 accompanying the primary beam. This is one of the plurality of beams in the horizontal plane of the conventional 8T8R system when digital precoding methods are combined with the fixed analog beamformer method is applied to the RF chain. The resulting spurs or side-lobes distort the quality of the total beam. The spurs occur because of the distance between the effective antennas of the set of twelve antennas is not uniform in both the vertical and horizontal directions. More specifically, the horizontal effective distance is 2Γ and the vertical effective distance is 6Γ. This result also occurs when employing an active array in which the main beams are directed toward the center of the relevant sub-sector.

For comparison, the center plot 17-4 of the top row illustrates the radiation pattern for an equivalent one of the plurality of beams in the horizontal plane of the conventional 32T32R system. This beam is generated by using only conventional digital precoding methods. Note the lack of sidelobes.

By applying the approach illustrated by FIG. 17, the beams depicted in plot 17-5 in the top row are generated. Note that this modified 8T8R system approach eliminates the unwanted sidelobes. That is, the approach illustrated by FIG. 17 compensates for the horizontal effective distance of 2Γ.

Similar results can be seen for the radiation pattern in a vertical plane (a view along the minus x-direction) where θ is equal to 0°. The first plot 17-6, which corresponds to using the combination of digital precoding method with the fixed analog beamformer correction method, produces has one sidelobe 17-9 accompanying the primary beam at about −9°.

As noted above in connection with the beam patterns in the horizontal plane, the sidelobes occur because the distance between the effective antennas of the set of twelve antennas is not uniform in both the vertical and horizontal directions. More specifically, the horizontal effective distance is 2Γ but the vertical effective distance is 6Γ. The vertical effective distance of 6Γ makes a pronounced spur 17-9. This result also occurs when employing an active array in which the main beam is directed toward the center of the relevant sub-sector.

For comparison, the center plot 17-8 of the bottom row illustrates an equivalent one of the plurality of beams in the vertical plane of the 32T32R system. This beam is generated by using only conventional digital precoding methods. Because the horizontal effective distance in the array is Γ while the vertical effective distance is 3Γ, the 32T32R antenna system generates a sidelobe 17-10.

By applying the approach illustrated by FIG. 17, the beams illustrated in plot 17-8 in the bottom row are generated. Note that the modified 8T8R system approach eliminates the unwanted sidelobes in this plane as well. That is, the approach illustrated by FIG. 17 compensates for the vertical effective distance of 6Γ.

Note that the conventional 32T32R system, which has a vertical effective distance is 3Γ, cannot fully compensate for this effective vertical antenna displacement.

The above-described approach which employed an 8T8R system can, of course, be generalized to other configurations. For example, if a 64T64R has the maximum scan angle and an 8T8R system is being used to achieve that coverage, one needs to scan eight times. Or, if a 16T16R system is being used, one needs to scan four times, etc.

FIG. 19 depicts a table that compares the performance in terms of throughput of a number of different systems (conventional vs. the modified 8T8R) for a single user (SU-MIMO) and a multi user (MU-MIMO) transmission cases when the channel is line of sight (LOS) and non-line of sight (NLOS). The conventional systems includes the conventional 8T8R (2, 2, 8, 8) system and the conventional 32T32R (4, 4, 8, 4) system. The modified 8T8R is compared to the conventional 32T32R (4, 4, 8, 4) system. In all cases, the last column provides the gain of the modified 8T8R system vs. the conventional 32T32R (4, 4, 8, 4) system. The modified 8T8R system outperforms the conventional systems in all cases (3%, 3%, 21%, and 31%). The last row shows that the modified 8T8R system demonstrates a 31% gain increase for a MU-MIMO system with 2 terminals over the conventional 32T32R (4, 4, 8, 4) system.

While the embodiments have been described using 2D rectangular arrays and certain practical configurations of (M, N, P), the disclosed concepts can be used with arrays of arbitrary shapes and sizes. Furthermore, the methods described herein can be implemented by using a processor in combination with computer-readable medium that contains a program for carrying out one or more of the described steps. The processor, which can be implemented within the base station, can include a single machine or multiple interacting machines or processors (located at a single location or at multiple locations remote from one another).

Other embodiments are within the following claims.

The invention claimed is:

1. A method involving a hybrid MIMO communications system including an active phased array antenna system for establishing communication with a terminal located within a spatial domain covered by the hybrid MIMO communications system, said active phased array antenna system including L ports and an array of M antenna elements, where M and L are integers and L<M, said method comprising:
sub-dividing the spatial domain into a plurality of sub-domains, wherein the plurality of sub-domains collectively constitutes the spatial domain and each sub-domain of the plurality of sub-domains is defined by a beam coverage having a maximum angular spread which the phased array antenna system is capable of during operation when MIMO digital precoding beam steering is employed without also actively employing analog beam steering within that sub-domain;
for each sub-domain of the plurality of sub-domains, defining a corresponding set of analog phase weights to be applied by the phased array antenna system for directing beams towards that sub-domain;
in succession, selecting each sub-domain among the plurality of sub-domains and for each selected sub-domain:
(a) in the phased array antenna system, applying the set of analog phase weights for that selected sub-domain;
(b) while the set of analog phase weights for that selected sub-domain is being applied, performing throughout the selected sub-domain channel sounding with the terminal; and
(c) receiving feedback from the terminal for that selected sub-domain, said feedback for that selected sub-domain including a precoding matrix indicator for that selected sub-domain; and
after selecting all sub-domains of the of plurality of sub-domains and from the feedback received from the terminal, identifying among the plurality of sub-domains a best sub-domain and from the feedback for that identified best sub-domain identifying a best precoding matrix indicator that in combination with the best sub-domain provides a best communication channel for the terminal.

2. The method of claim 1, comprising:
defining a plurality of sub-arrays within the array of M antenna elements, each sub-array of the plurality of sub-arrays associated with a different port among the L ports; and
wherein defining for each sub-domain the corresponding set of analog phase weights to be applied by the phased array antenna system for causing each sub-array of the plurality of sub-arrays to direct a beam towards that sub-domain.

3. The method of claim 2, further comprising using the best communication channel to carry out data communication with the terminal.

4. The method of claim 3, wherein using the best communication channel to carry out data communication with the terminal comprises employing the identified best precoding matrix indicator for the identified best sub-domain and in the phased array antenna system, applying the set of analog phase weights for the identified best sub-domain to direct beams towards the identified best sub-domain.

5. The method of claim 3, further comprising, after identifying the best sub-domain and the best precoding matrix indicator for that identified best sub-domain, deriving from the identified best precoding matrix indicator and the set of analog phase weights for the identified best sub-domain a revised set of analog phase weights and wherein using the best communication channel to carry our data communication with the terminal comprises applying the revised set of analog phase weights by the phased array antenna system.

6. The method of claim 5, wherein using the best communication channel to carry out data communication with the terminal does not directly use the identified best precoding matrix indicator to perform any beam steering.

7. The method of claim 6, wherein using the best communication channel to carry out data communication with the terminal does not directly use any precoding matrix indicator to perform any beam steering.

8. The method of claim 4, wherein the set of analog phase weights for the identified best sub-domain causes the phased array antenna system to direct beams towards the center of the identified best sub-domain.

9. The method of claim 5, wherein the revised set of analog phase weights causes the phased array antenna system to direct a beam towards the terminal within the domain.

10. The method of claim 2, wherein performing channel sounding with the terminal while a sub-domain is selected involves sending reference signals to the terminal.

11. The method of claim 2, wherein performing channel sounding with the terminal while a sub-domain is selected involves non-precoded reference signal transmission.

12. The method of claim 11, wherein performing channel sounding with the terminal while a sub-domain is selected involves Class-A transmission.

13. The method of claim 2, wherein performing channel sounding with the terminal while a sub-domain is selected involves precoded reference signal transmission.

14. The method of claim 13, wherein performing channel sounding with the terminal while a sub-domain is selected involves Class-B transmission.

15. The method of claim 2, wherein the feedback from the terminal also includes a Channel Quality Indicator (CQI).

16. The method of claim 2, wherein each sub-array of the plurality of sub-arrays has N antenna elements, wherein N is an integer and wherein N<M.

17. The method of claim 16, wherein the plurality of sub-arrays consists of L sub-arrays.

18. The method of claim 17, wherein L×N=M.

19. The method of claim 18, wherein the plurality of sub-arrays includes a first group of L/2 sub-arrays and a second group of L/2 sub-arrays, wherein each sub-array of the first group of L/2 sub-arrays has N/2 antenna elements having a first polarization and each sub-array of the second group of L/2 sub-arrays has N/2 elements having a second polarization that is orthogonal to the first polarization.

20. The method of claim 17, wherein each port of the L ports is connected to a different sub-array among the L sub-arrays.

* * * * *